(12) United States Patent
Chaumonnot et al.

(10) Patent No.: US 8,821,714 B2
(45) Date of Patent: Sep. 2, 2014

(54) CATALYST BASED ON A MATERIAL WITH A HIERARCHICAL POROSITY COMPRISING SILICON, AND A PROCESS FOR HYDROCRACKING/HYDROCONVERSION AND HYDROTREATMENT OF HYDROCARBON FEEDS

(75) Inventors: Alexandra Chaumonnot, Lyons (FR); Patrick Bourges, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 1468 days.

(21) Appl. No.: 12/515,862

(22) PCT Filed: Oct. 29, 2007

(86) PCT No.: PCT/FR2007/001805
§ 371 (c)(1),
(2), (4) Date: Jan. 25, 2010

(87) PCT Pub. No.: WO2008/068398
PCT Pub. Date: Jun. 12, 2008

(65) Prior Publication Data
US 2010/0140138 A1    Jun. 10, 2010

(30) Foreign Application Priority Data
Nov. 23, 2006  (FR) ...................................... 06 10270

(51) Int. Cl.
*C10G 47/02*   (2006.01)

(52) U.S. Cl.
USPC ............................................ 208/108; 208/57

(58) Field of Classification Search
USPC ............................................. 208/57; 502/66
See application file for complete search history.

(56) References Cited

U.S. PATENT DOCUMENTS 6,106,802 A *   8/2000  Lujano et al. .................. 423/702
6,669,924 B1 * 12/2003  Kaliaguine et al. ............ 423/702
2001/0031241 A1 10/2001  Lacombe et al.
2004/0226860 A1 11/2004  Bourges et al.
2006/0030477 A1 *  2/2006  Chaumonnot et al. .......... 502/64
2006/0052236 A1 *  3/2006  Angevine et al. ............... 502/66
2006/0292054 A1 12/2006  Chaumonnot et al.
2009/0188834 A1 *  7/2009  Euzen et al. ............... 208/111.3

FOREIGN PATENT DOCUMENTS

| EP | 1108678 A1 | 6/2001 |
|----|------------|--------|
| FR | 2851569 A1 | 8/2004 |
| FR | 2872151 A  | 12/2005 |
| FR | 2872152 A1 | 12/2005 |
| WO | 03064039 A | 8/2003 |
| WO | 2005042148 A | 5/2005 |
| WO | 2006029137 A | 3/2006 |
| WO | PCTFR2007001805 R | 7/2008 |

OTHER PUBLICATIONS

Guo et al. "New MCM—41—.beta.—zeolite composite molecular sieve with meosporous and microporous structure." Chemabs, 1999.

* cited by examiner

*Primary Examiner* — Randy Boyer
*Assistant Examiner* — Juan Valencia
(74) *Attorney, Agent, or Firm* — Millen, White, Zelano & Branigan, P.C.

(57) ABSTRACT

The invention describes a catalyst comprising at least one material with a hierarchical porosity comprising silicon and at least one hydrodehydrogenating element from group VIB and/or group VIII of the periodic table of the elements. Said material with a hierarchical porosity comprising silicon is constituted by at least two elementary spherical particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 30 nm, said elementary spherical particles having a maximum diameter of 100 μm. The matrix based on silicon oxide may contain aluminum. The catalyst also optionally comprises at least one doping element in a controlled quantity selected from phosphorus, boron and silicon, optionally at least one element from group VB of the periodic table of the elements, and optionally an element from group VIIA. The invention also concerns hydrocracking/hydroconversion and hydrotreatment processes employing said catalyst.

29 Claims, No Drawings

CATALYST BASED ON A MATERIAL WITH A HIERARCHICAL POROSITY COMPRISING SILICON, AND A PROCESS FOR HYDROCRACKING/HYDROCONVERSION AND HYDROTREATMENT OF HYDROCARBON FEEDS

The present invention relates to the field of bifunctional catalysts characterized by hydrodehydrogenating properties and acidity. More particularly, it relates to a catalyst comprising at least one metallosilicate material and more precisely aluminosilicate having a hierarchical porosity in the region of microporosity and mesoporosity and at least one hydrodehydrogenating element. It also pertains to the preparation of such a catalyst.

The invention also relates to hydrocracking, hydroconversion and hydrotreatment processes employing said catalyst.

In particular, the invention concerns the hydrocracking of hydrocarbon feeds containing, for example, aromatic compounds and/or olefinic compounds and/or naphthenic compounds and/or paraffinic compounds with the exception of feeds from the Fischer-Tropsch process and possibly containing metals and/or nitrogen and/or oxygen and/or sulphur.

The aim of the hydrocracking process is essentially the production of middle distillates, i.e. cuts with an initial boiling point of at least 150° C. and an end point of up to just below the initial boiling point of residue, for example less than 340° C. or less than 370° C.

The invention also concerns the hydrotreatment of hydrocarbon feeds such as oil cuts, cuts from coal or hydrocarbons produced from natural gas. Said hydrocarbon feeds comprise nitrogen and/or sulphur and/or aromatic compounds and/or olefinic and/or naphthenic and/or paraffinic compounds, said feeds possibly containing metals and/or oxygen and/or sulphur. The term "hydrotreatment" means hydrogenation, hydrodesulphurization, hydrodenitrogenation, hydrodeoxygenation, hydrodearomatization and hydrodemetallization reactions.

PRIOR ART

Hydrocracking heavy petroleum cuts is a very important refining process which can produce lighter fractions such as gasolines, jet fuels and light gas oils from excess heavy feeds which are of low value. The refiner seeks such processes in order to adapt production to demand. Certain hydrocracking processes can also produce a highly purified residue which can provide excellent base oils. In comparison with catalytic cracking, the importance of catalytic hydrocracking is to produce very good quality middle distillates, jet fuels and gas oils. In contrast, the gasoline produced has a much lower octane number than that from catalytic cracking.

Hydrocracking is a process which derives its flexibility from three principal elements, namely the operating conditions used, the types of catalysts employed and the fact that hydrocracking of hydrocarbon feeds may be carried out in one or two steps.

The catalysts used for hydrocracking are all bifunctional in type, combining an acid function with a hydrodehydrogenating function. The acid function is provided by supports with surface areas which are generally from 150 to 800 m²/g with superficial acidity, such as halogenated aluminas (in particular chlorinated or fluorinated), combinations of boron and aluminium oxides, mesoporous amorphous aluminosilicates and zeolites. The hydrodehydrogenating function is provided either by one or more metals from group VIB of the periodic table, or by combination with at least one metal from group VIB of the periodic table with at least one group VIII metal.

The equilibrium between the two functions, acid and hydrodehydrogenating, is a parameter which governs the activity and selectivity of the catalyst. A weak acid function and a strong hydrodehydrogenating function produces catalysts with low activity, which generally operate at a high temperature (greater than or equal to 390° C.-400° C.), and at a low space velocity (the HSV expressed as the volume of feed to be treated per unit volume of catalyst per hour is generally less than or equal to 2), but they have very high selectivity for middle distillates. In contrast, a strong acid function and weak hydrodehydrogenating function produce active catalysts which, however, have poor selectivity for middle distillates (jet fuels and gas oils).

One conventional type of hydrocracking catalyst is based on moderately acidic amorphous supports such as mesoporous aluminosilicates, for example. Such systems are used to produce high quality middle distillates and possibly base oils. Such catalysts are, for example, used in once-through processes. The disadvantage of such catalysts based on an amorphous mesoporous support is their low activity.

Catalysts comprising, for example, a Y zeolite with structure type FAU, or catalysts comprising, for example, a beta type zeolite (structure type BEA) have a higher catalytic activity than that of amorphous mesoporous aluminosilicates but have selectivities for middle distillates (jet fuels and gas oils) which are lower.

One of the scientific challenges of recent years has consisted of developing novel aluminosilicate supports which may or may not be crystalline, which could present an acceptable compromise between catalytic activity and selectivity for middle distillates and which could lie half way between a zeolitic type behaviour and an amorphous mesoporous aluminosilicate type behaviour.

Further, the proportion of compounds denoted as "heavy" in unrefined feeds to be treated is increasing constantly and so the development of catalysts having textural properties which are adapted to these new feeds also represents a major challenge.

On this quest for novel aluminosilicate materials, materials termed "mesostructured", discovered at the beginning of the 1990s, represent a seductive alternative (G J de A A Soler-Illia, C Sanchez, B Lebeau, J Patarin, Chem Rev 2002, 102, 4093). In particular, the development of syntheses using "mild chemistry" methods has led to the production of mesostructured materials with a controlled pore morphology and size. Such mesostructured materials are generated at low temperature by the co-existence in aqueous solution or in polar solvents of inorganic precursors with templates, generally molecular or supramolecular ionic or neutral surfactants. Controlling the electrostatic interactions or hydrogen bonding between the inorganic precursors and the template jointly with hydrolysis/condensation reactions of the inorganic precursor leads to a cooperative organization of the organic and inorganic phases, generating micellar aggregates of surfactants of controlled uniform size in an inorganic matrix. This cooperative self-organization phenomenon governed, inter alia, by the concentration of the template, may be induced by progressive evaporation of a solution of reagents in which the concentration of the template is lower than the critical micellar concentration, which leads, for example, to the formation of a mesostructured powder after the solution is atomized (aerosol technique). The pores are then freed by eliminating the surfactant, this being carried out conventionally by chemical extraction processes or by heat treatment. Several classes of mesostructured materials have been developed as a function of the natures of the inorganic precursors and the template employed as well as the operating conditions imposed. As an example, the M41S class initially developed by Mobil (J S Beck, J C Vartuli, W J Roth, M E Leonowicz, C T Kresge, K D Schmitt, C T-W Chu, D H Olson, E W Sheppard, S B McCullen, J B Higgins, J L Schlenker, J Am Chem Soc, 1992, 114, 27, 10834) constituted by mesoporous materials obtained using ionic surfactants such as quaternary ammonium salts, having a generally hexagonal, cubic or lamellar structure, with pores of uniform size in the range 1.5 to 10 nm and amorphous walls with a thickness of the order of 1 to 2 nm, has been widely studied. Similarly, the use of block copolymer type amphiphilic macromolecule templates has led to the production of the SBA family of materials, these solids being characterized by a generally hexagonal, cubic or lamellar structure, with uniformly sized pores in the range 4 to 50 nm and amorphous walls with a thickness in the range 3 to 7 nm.

However, it has been shown that although they have particularly interesting textural and structural properties (in particular for the processing of heavy feeds), the mesostructured aluminosilicate materials obtained developed a catalytic activity which was almost indistinguishable from that of their homologues with a non-organized porosity (D Zaho, J Feng, Q Huo, N Melosh, G H Fredrickson, B F Chmelke, G D Stucky, Science, 1998, 279, 548; Y-H Yue, A Gédéon, J-L Bonardet, J B d'Espinose, N Melosh, J Fraissard, Stud Surf Sci Catal 2000, 129, 209). A great many studies were thus undertaken with the aim of producing aluminosilicate materials having both the advantages of an organized mesoporous structure and those of a micro-crystalline framework.

A large number of synthesis techniques which can produce mixed materials or mesostructure/zeolite composites have been recorded in the open literature (U.S. Pat. No. 6,669,924; Z Zhang, Y Han, F Xiao, S Qiu, L Zhu, R Wang, Y Yu, Z Zhang, B Zou, Y Wang, H Sun, D Zhao, Y Wei, J Am Chem. Soc, 2001, 123, 5014; A Karlsson, M Stöcker, R Schmidt, Micropor Mesopor Mater 1999, 27, 181; P Prokesova, S Mintova, J Cejka, T Bein, Micropor Mesopor Mater, 2003, 64, 165; D T On, S Kaliaguine, Angew Chem Int Ed, 2002, 41, 1036). From an experimental point of view, in contrast to the "aerosol" technique cited above, aluminosilicate materials with a hierarchical porosity as defined are not obtained by progressive concentration of inorganic precursors and template(s) in the solution in which they are present, but are obtained conventionally by direct precipitation from an aqueous solution or from polar solvents by adjusting the value of the critical micellar concentration of the template. Further, synthesis of such materials obtained by precipitation necessitates a maturation step in an autoclave as well as a step for filtering the suspension generated. The elementary particles normally obtained are not regular in shape and are generally characterized by a size that is generally between 200 and 500 nm, sometimes more.

SUMMARY OF THE INVENTION

The invention concerns a catalyst comprising at least one material with a hierarchical porosity comprising silicon and at least one hydrodehydrogenating element from group VIB and/or group VIII of the periodic table of the elements. Said material with a hierarchical porosity comprising silicon is constituted by at least two elementary spherical particles, each of said spherical particles comprising zeolitic nanocrystals with a pore size in the range 0.2 to 2 nm and a matrix based on silicon oxide, which is mesostructured, having a pore size in the range 1.5 to 30 nm and with amorphous walls with a thickness in the range 1 to 30 nm, said elementary spherical particles having a maximum diameter of 100 μm. Said matrix based on silicon oxide optionally further comprises at least one element X selected from the group constituted by aluminium, titanium, tungsten, zirconium, gallium, germanium, phosphorus, tin, antimony, lead, vanadium, iron, manganese, hafnium, niobium, tantalum and yttrium, preferably from the group constituted by aluminium, titanium, zirconium, niobium, germanium and gallium, and more preferably aluminium. Said zeolitic nanocrystals present in each of the elementary spherical particles constituting the material of the invention may be generated by any zeolite or related solid developing acidity properties and in particular by solids of the aluminosilicate and/or silicoaluminophosphate type. Said material with a hierarchical porosity comprising silicon forms the subject matter of patent application FR-2 872 152 A. The catalyst of the invention also optionally includes at least one doping element in a controlled quantity selected from phosphorus, boron and silicon, optionally at least one element from group VB of the periodic table of the elements, preferably niobium, and optionally at least one element from group VIIA, preferably fluorine. The present invention also concerns the preparation of the catalyst of the invention. Further, the present invention concerns hydrocracking, hydroconversion and hydrotreatment processes employing said catalyst.

ADVANTAGE OF THE INVENTION

The material with hierarchical porosity comprising silicon and constituted by at least two elementary spherical particles which comprise an inorganic mesostructured matrix based on silicon oxide, with amorphous walls in which zeolitic nanocrystals are trapped, and present in the catalyst of the invention, simultaneously presents the structural, textural and acid-basic properties of materials from the zeolite class and/or related solids and of materials based on silicon oxide, more precisely mesostructured aluminosilicate materials. Manufacture on the nanometric scale of a composite material based on mesostructured silicon/zeolites results in a fortuitous combination of microporous and mesoporous zones within the same spherical particle. Further, since the material present in the catalyst of the invention is constituted by elementary spherical particles, the maximum diameter of said particles is 100 μm and advantageously 50 nm to 100 μm, preferably 50 nm to 10 μm, still more preferably 50 nm to 1 μm, even more preferably 50 nm to 600 nm; highly preferably, it is in the range 50 to 300 nm; the limited dimension of said particles and their homogeneous shape results in better diffusion of the reagents and reaction products during use of the material as a base element for the catalyst of the invention in hydrocracking, hydroconversion and hydrotreatment processes compared with known prior art catalysts. Further, the zeolite nanocrystals dispersed in said material with a hierarchical porosity have a maximum dimension of 500 nm. Using small zeolite crystals produces gains in activity for hydrocracking and gains in selectivity for middle distillates.

The set of properties of the material with a hierarchical porosity comprising silicon thus induces specific catalytic properties in the catalyst of the invention comprising said material during its use in hydrocracking, hydroconversion and hydrotreatment processes. The research work carried out by the Applicant on innovative solids and on active hydrodehydrogenating phases has led to the discovery that a catalyst for hydrocracking, hydroconversion and hydrotreatment of hydrocarbon feeds comprising at least said material with a hierarchical porosity comprising silicon, at least one hydrodehydrogenating metal selected from metals from groups VIB and VIII, optionally at least one doping element selected from the group formed by boron, silicon and phosphorus, optionally at least one element from group VB of the periodic table of the elements (preferably niobium) and optionally an element from group VIIA (preferably fluorine) can produce activities (i.e. levels of conversion) which are high compared with those generated by conventional catalysts based on amorphous aluminosilicates with a non-organized porosity and selectivities for middle distillates (jet fuel and gas oil) which are higher than with known prior art zeolitic catalysts.

Characterization Techniques

The catalyst of the invention and the support formed from said material with a hierarchical porosity present in the catalyst of the invention are characterized using several analytical techniques and in particular by small angle X ray diffraction (small angle XRD), large angle X ray diffraction (XRD), the nitrogen adsorption isotherm, transmission electron microscopy (TEM) optionally coupled with energy dispersive X ray spectrometry (EDX), Castaing microprobe, X ray fluorescence electron microprobe (FX) or atomic absorption (AA).

Large angle X ray diffraction (2θ in the range 5° to 70° can be used to characterize a crystalline solid defined by repetition of a unit cell or lattice on the molecular scale. In the discussion below, X ray analysis is carried out on a powder using a diffractometer operating in reflection equipped with a back monochromator using the copper radiation line (wavelength 1.5406 Å). The peaks normally observed on diffractograms corresponding to a given value for the angle 2θ are associated with the interplanar spacings $d_{hkl}$ which are characteristic of the structural symmetry of the material, (hkl being the Miller indices of the reciprocal lattice) by the Bragg relationship: $2d_{hkl}*\sin(\theta)=n*\lambda$. This indexation allows the lattice parameters (a, b, c) of the framework to be determined directly. Thus, large angle XRD analysis is adapted to structural characterization of the zeolitic nanocrystals present in each of the elementary spherical particles of the material with a hierarchical porosity comprising silicon present in the catalyst of the invention. In particular, it provides access to the pore dimensions of the zeolitic nanocrystals. Using the same principle, the small angle X ray diffraction technique (values for angle 2θ in the range 0.5° and 3°) can characterize the periodicity on a nanometric scale generated by the organized mesoporosity of the catalyst of the invention. The value of the lattice parameters (a, b, c) is a function of the hexagonal, cubic or vermicular structure obtained. The value of the angle obtained on the XRD diffractogram allows the correlation distance, d, to be deduced using Bragg's law: $2d*\sin(\theta)=n*\lambda$.

Nitrogen adsorption isothermal analysis corresponding to the physical adsorption of nitrogen molecules in the pores of the material on progressively increasing the pressure at constant temperature provides information regarding the textural characteristics (pore diameter, porosity type, specific surface area) which are peculiar to the catalyst of the invention. In particular, it provides access to the specific surface area and to the mesoporous distribution of the catalyst of the invention. The term "specific surface area" means the BET specific surface area ($S_{BET}$ in $m^2/g$) determined by nitrogen adsorption in accordance with American standard ASTM D 3663-78 established using the BRUNAUER-EMMETT-TELLER method described in the periodical "The Journal of the American Society", 60, 309, (1938). The pore distribution representative of a population of mesopores centered in a range of 1.5 to 50 nm is determined using the Barrett-Joyner-Halenda (BJH) model. The nitrogen adsorption-desorption isotherm using the BJH model is described in the periodical "The Journal of the American Society", 73, 373 (1951) written by E P Barrett, L G Joyner and P P Halenda. In the description below, the mesopore diameter φ of the catalyst of the invention corresponds to the mean diameter for nitrogen desorption defined as a diameter such that all pores with less than that diameter constitute 50% of the pore volume (Vp) measured on the desorption arm of the nitrogen isotherm. Further, the shape of the nitrogen adsorption isotherm and the hysteresis loop can provide information regarding the presence of microporosity linked to zeolitic nanocrystals and the nature of the mesoporosity.

Group electron microscope analysis (TEM) is a technique which is also widely used to characterize the mesostructure of the material of the invention. This allows an image of the solid being studied to be formed, the contrasts observed being characteristic of the structural organization, texture or morphology or even the zeolite/mesostructure composition of the particles observed, the resolution of the technique reaching a maximum of 0.2 nm Analysis of the image also provides access to the parameters $d_{hkl}$, and φ, characteristic of the catalyst of the invention defined above. It is also possible to visualize on the same image more or less spherical opaque objects representing the zeolitic nanocrystals trapped in the mesostructured matrix forming the spherical particles of the hierarchical porosity material present in the catalyst of the invention.

The distribution and localization of the elements constituting the hydrogenating phase may be determined using techniques such as the Castaing microprobe (distribution profile of various elements), group electron microscopy coupled with X ray analysis of the catalyst components (EDX), or by establishing a distribution map of the elements present in the catalyst by electron microprobe. Those techniques can demonstrate the presence of these exogenic elements added after synthesis of the material with a hierarchical porosity comprising silicon and present in the catalyst of the invention. The distribution and localization of the elements from group VIB such as molybdenum or tungsten, from group VIII such as iron, cobalt, nickel, platinum or palladium, from group VB such as niobium, group VIIA such as fluorine, may be determined using these techniques. Similarly, the distribution and localization of boron, silicon and phosphorus may be determined using these techniques.

The overall composition of the catalyst of the invention may be determined by X ray fluorescence (XF) on said catalyst in a powdered state or by atomic absorption (AA) after acid attack of said catalyst.

DETAILED DISCLOSURE OF THE INVENTION

More precisely, the invention pertains to a catalyst comprising:
  at least one support formed from at least one material with a hierarchical porosity comprising silicon and constituted by at least two elementary spherical particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 30 nm, said elementary spherical particles having a maximum diameter of 100 μm;
  at least one active phase containing at least one hydrodehydrogenating element from group VIB and/or group VIII of the periodic table of the elements.

According to the invention, the element from group VIB is advantageously present in an amount by weight of metal in the range 0.1% to 40%, preferably in the range 1.5% to 35% and more preferably in the range 3% to 25%, the percentages being expressed as a % by weight with respect to the total mass of catalyst and the group VIII element is advantageously present in an amount by weight of metal in the range 0.1% to 25%, preferably in the range 0.1% to 20% and more preferably in the range 0.1% to 15%; said material with a hierarchical porosity is advantageously present in an amount by weight in the range 20% to 99.9%, preferably in the range 30% to 99.9% and more preferably in the range 40% to 99.9%.

The catalyst of the invention comprises:
optionally, at least one doping element selected from the group constituted by silicon (in addition to the silicon contained in said material with a hierarchical porosity present in the catalyst of the invention), boron and phosphorus, present in an amount by weight in the range 0 to 20%, preferably in the range 0.1% to 15%, more preferably in the range 0.1% to 10% and still more preferably in the range 0.2% to 4%;
optionally, at least one element from group VB, preferably niobium, present in an amount by weight in the range 0 to 60%, preferably in the range 0.1% to 50%, and more preferably in the range 0.1% to 40%;
optionally, at least one element from group VIIA, preferably fluorine, present in an amount by weight in the range 0 to 20%, preferably in the range 0.1% to 15%, and more preferably in the range 0.1% to 10%;
optionally, a binder such as silica, alumina, clays, titanium oxide, boron oxide or zirconia or any mixture of said binders. Preferred binders are silica and alumina and more preferably alumina. The amount by weight of binder on the catalyst is in the range 0 to 30%, preferably in the range 0 to 20%. The catalyst of the invention is preferably free of binder.

In accordance with a first embodiment of the catalyst of the invention, the hydrodehydrogenating element of said active phase comprised in said catalyst is an element selected from the group formed by elements from group VIB and is preferably selected from molybdenum and tungsten.

In accordance with a preferred mode of said first embodiment of the catalyst of the invention, the hydrodehydrogenating element of said active phase comprised in said catalyst is an element selected from the group formed by elements from group VIB of the periodic table of the elements, namely molybdenum.

In accordance with another preferred mode of said first embodiment of the catalyst of the invention, the hydrodehydrogenating element selected from the group formed by elements from group VIB of the periodic table of the elements is tungsten.

In accordance with a second embodiment of said catalyst of the invention, the hydrodehydrogenating element of said active phase comprised in said catalyst is an element selected from the group formed by elements from group VIII and is preferably selected from iron, cobalt, nickel, ruthenium, rhodium, palladium, osmium, iridium and platinum, taken alone or as a mixture, more preferably selected from iron, cobalt, nickel, platinum, palladium and ruthenium, taken alone or as a mixture, and still more preferably selected from cobalt, nickel and platinum, taken alone or as a mixture.

According to a preferred mode of said second embodiment of the catalyst of the invention, the hydrodehydrogenating element selected from the group formed by elements from group VIII of the periodic table of the elements is cobalt.

According to another preferred mode of said second embodiment of the catalyst of the invention, the hydrodehydrogenating element selected from the group formed by elements from group VIII of the periodic table of the elements is nickel.

According to yet another preferred mode of said second embodiment of the catalyst of the invention, the hydrodehydrogenating element selected from the group formed by elements from group VIII of the periodic table of the elements is platinum.

According to a third embodiment of the catalyst of the invention, said active phase included in said catalyst is formed by at least one element from group VIB and at least one element from group VIII.

According to said third embodiment of the catalyst of the invention, and in an advantageous manner, the active phase uses the following combinations of metals: nickel-molybdenum, cobalt-molybdenum, iron-molybdenum, iron-tungsten, nickel-tungsten, cobalt-tungsten, platinum-palladium, preferably the following combinations: nickel-molybdenum, cobalt-molybdenum, cobalt-tungsten, nickel-tungsten and still more preferably the following combinations: nickel-molybdenum and nickel-tungsten.

It is also possible to use as the active phase combinations of three metals, for example nickel-cobalt-molybdenum, nickel-molybdenum-tungsten, nickel-cobalt-tungsten, etc. Advantageously, the following combinations of metals are used: nickel-niobium-molybdenum, cobalt-niobium-molybdenum, iron-niobium-molybdenum, nickel-niobium-tungsten, cobalt-niobium-tungsten, iron-niobium-tungsten and preferably nickel-niobium-molybdenum and cobalt-niobium-molybdenum combinations.

It is also possible to use as the active phase combinations of four metals, for example nickel-cobalt-niobium-molybdenum. It is also possible to use combinations containing a noble metal such as ruthenium-niobium-molybdenum, or even ruthenium-nickel-niobium-molybdenum.

Said material with a hierarchical porosity comprising silicon present in the catalyst of the invention is constituted by at least two elementary spherical particles, each of said spherical particles comprising zeolitic nanocrystals with a pore size in the range 0.2 to 2 nm and a matrix based on silicon oxide, which is mesostructured, with a pore size in the range 1.5 to 30 nm and having amorphous walls with a thickness in the range 1 to 30 nm, said elementary spherical particles having a maximum diameter of 100 µm.

The term "material with a hierarchical porosity" as used in the context of the present invention means a material having a double porosity on the scale of each of said spherical particles: mesoporosity, i.e. a porosity organized on the mesopore scale, having a uniform dimension in the range 1.5 to 30 nm, preferably in the range 1.5 to 10 nm, distributed homogeneously and in a regular manner in each of said particles (mesostructuring), and a zeolitic type microporosity the characteristics of which (zeolite and/or related solid structure type, chemical composition of the zeolitic framework) are a function of the choice of zeolitic nanocrystals.

In accordance with the invention, said zeolitic nanocrystals have a pore size in the range 0.2 to 2 nm, preferably in the range 0.2 to 1 nm and more preferably in the range 0.2 to 0.8 nm Said nanocrystals generate the microporosity in each of the elementary spherical particles constituting the material with a hierarchical porosity comprising silicon and present in the catalyst of the invention.

The matrix based on silicon oxide included in each of the spherical particles constituting said material with hierarchical porosity present in the catalyst of the invention is mesostructured: it has mesopores having a uniform size in the range 1.5 to 30 nm and preferably in the range 1.5 to 10 nm, distributed homogeneously and regularly in each of said particles. The material located between the mesopores of each of said spherical particles is amorphous and forms walls the thickness of which is in the range 1 to 30 nm. The thickness of the walls corresponds to the distance separating one pore from another pore. The organization of the mesoporosity described above results in a structuring of the matrix based on silicon oxide, which may be hexagonal, vermicular or cubic, preferably vermicular.

In accordance with a particular implementation of the material of the invention, the matrix based on silicon oxide, which is mesostructured, is entirely silicic.

In accordance with a further particular mode of the catalyst of the invention, the matrix based on silicon oxide, which is mesostructured, further comprises at least one element X selected from the group constituted by aluminium, titanium, tungsten, zirconium, gallium, germanium, phosphorus, tin, antimony, lead, vanadium, iron, manganese, hafnium, niobium, tantalum and yttrium, preferably from the group constituted by aluminium, titanium, zirconium, niobium, germanium and gallium, and more preferably aluminium. Preferably, the element X is aluminium: in this case the matrix of the material of the invention is an aluminosilicate. Said aluminosilicate has a Si/Al molar ratio of at least 1, preferably in the range 1 to 1000 and more preferably in the range 1 to 100.

According to the invention, the zeolitic nanocrystals advantageously represent 0.1% to 40% by weight, preferably 0.1% to 20% by weight and more preferably 0.1% to 10% by weight of the material with a hierarchical porosity comprising silicon of the invention. Any zeolite or related solid developing acidity properties; in particular but not exhaustively those listed in the "Atlas of zeolite framework types", 5$^{th}$ revised Edition, 2001, Ch Baerlocher, W M Meier, D H Olson may be employed in the zeolitic nanocrystals present in each of the elementary spherical particles constituting the material with a hierarchical porosity comprising silicon and present in the catalyst of the invention.

The term "zeolite or related solid well known to the skilled person" means the set of microporous crystalline oxide solids the constituent atomic elements of the inorganic framework of which has IV coordination. By definition, the denomination "zeolite" is attributed to said silicic or aluminosilicic microporous oxide solids. Similarly, the denomination "related solid" concerns the set of crystalline microporous oxide solids the constituent atomic elements of the inorganic framework of which has IV coordination, said silicic or aluminosilicic microporous oxide solids being excluded. Any zeolite or related solid having at least one trivalent atomic element at the origin of the presence of a negative charge on said framework and which may be compensated for by a positive charge of a protonic nature may develop acidity properties. In particular, aluminosilicate type zeolites and related solids of the silicoaluminophosphate type develop such properties.

The zeolitic nanocrystals preferably comprise at least one zeolite selected from the following aluminosilicates: ZSM-5, ZSM-48, ZSM-22, ZSM-23, ZBM-30, EU-1, EU-2, EU-11, beta, zeolite A, Y, USY, VUSY, SDUSY, mordenite, NU-87, NU-88, NU-86, NU-85, IM-5, IM-12, and ferrierite and/or at least one related solid selected from silicoaluminophosphates SAPO-11 and SAPO-34. Most preferably, the zeolitic nanocrystals comprise at least one zeolite selected from aluminosilicates with structure type MFI, BEA, FAU and LTA and/or at least one related solid selected from silicoaluminophosphates with structure type AEL, CHA. Nanocrystals of different zeolites and/or different related solids and in particular zeolites and/or related solids with different structure types may be present in each of the spherical particles constituting the material with a hierarchical porosity comprising silicon and present in the catalyst of the invention. In particular, each of the spherical particles constituting the material with a hierarchical porosity comprising silicon and present in the catalyst of the invention may advantageously comprise at least the first zeolitic nanocrystals derived from a zeolite selected from the following aluminosilicates: ZSM-5, ZSM-48, ZSM-22, ZSM-23, ZBM-30, EU-1, EU-2, EU-11, beta, zeolite A, Y, USY, VUSY, SDUSY, mordenite, NU-87, NU-88, NU-86, NU-85, IM-5, IM-12 and ferrierite and/or the first zeolitic nanocrystals derived from a related solid selected from the silicoaluminophosphates SAPO-11 and SAPO-34, preferably from zeolites with structure type MFI, BEA, FAU and LTA and/or related solids with structure type AEL, CHA, and at least second zeolitic nanocrystals derived from a zeolite and/or a related solid which is different from that which has generated the first zeolitic nanocrystals and selected from the following zeolites: ZSM-5, ZSM-48, ZSM-22, ZSM-23, ZBM-30, EU-2, EU-11, beta, zeolite A, Y, USY, VUSY, SDUSY, mordenite, NU-87, NU-88, NU-86, NU-85, IM-5, IM-12, ferrierite and EU-1, preferably from zeolites with structure type MFI, BEA, FAU and LTA and/or related solids selected from the silicoaluminophosphates SAPO-11 and SAPO-34, preferably from related solids with structure type AEL, CHA.

In accordance with the invention, the maximum diameter of said elementary spherical particles constituting the material with hierarchical porosity comprising silicon and present in the catalyst of the invention is 100 µm, said diameter advantageously being in the range 50 nm to 100 µm, preferably in the range 50 to 10 µm and more preferably in the range 50 to 600 nm and still more preferably in the range 50 nm to 300 nm. More precisely, they are present in the material with a hierarchical porosity comprising silicon and present in the catalyst of the invention in the form of aggregates.

The material with a hierarchical porosity comprising silicon and present in the catalyst of the invention advantageously has a specific surface area in the range 100 to 1100 m$^2$/g, highly advantageously in the range 200 to 800 m$^2$/g.

The catalyst of the invention advantageously has a specific surface area in the range 70 to 1000 m$^2$/g and more advantageously in the range 80 to 800 m$^2$/g.

The catalyst of the invention advantageously has a mean mesoporous diameter in the range 1.5 to 30 nm and highly advantageously in the range 3 to 15 nm.

The present invention also pertains to the preparation of the catalyst of the invention.

The material with a hierarchical porosity comprising silicon and present in the catalyst of the invention is obtained using two possible preparation processes. A first implementation of the process for preparing said material with a hierarchical porosity, hereinafter termed the "first process for preparing said material with a hierarchical porosity" comprises:

a) synthesis, in the presence of a template, of zeolitic nanocrystals with a maximum nanometric dimension of 500 nm to obtain a colloidal solution in which said nanocrystals are dispersed;

b) mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and at least one colloidal solution obtained in accordance with a);

c) aerosol atomization of the solution obtained in step b) to result in the formation of spherical droplets with a diameter of less than 200 µm;

d) drying said droplets; and e) eliminating said template and said surfactant to obtain a material with a hierarchical porosity.

In accordance with step a) of the first process for preparing the material with a hierarchical porosity comprising silicon constituting the catalyst of the invention, the zeolitic nanocrystals are synthesized using operating protocols which are known to the skilled person. In particular, the synthesis of beta zeolite nanocrystals has been described by T Bein et al, Micropor Mesopor Mater, 2003, 64, 165. The synthesis of Y zeolite nanocrystals has been described by T J Pinnavaia et al, J Am Chem Soc, 2000, 122, 8791. The synthesis of ZSM-5 zeolite nanocrystals has been described by R Mokaya et al, J Mater Chem., 2004, 14, 863. In general, zeolitic nanocrystals are synthesized by preparing a reaction mixture comprising at least one silicon source, at least one source of aluminium, optionally at least one source of phosphorus and at least one template. The reaction mixture is either aqueous or hydro-organic, for example a water-alcohol mixture. The reaction mixture is advantageously placed under hydrothermal conditions under autogenous pressure, optionally by adding a gas, for example nitrogen, at a temperature in the range 50° C. to 200° C., preferably in the range 60° C. to 170° C. and more preferably at a temperature which does not exceed 120° C. until the zeolitic nanocrystals are formed. At the end of said hydrothermal treatment, a colloidal solution is obtained in which the nanocrystals are in the dispersed state. The template may be ionic or neutral depending on the zeolite/related solid to be synthesized. It is normal to use templates from the following non exhaustive list: nitrogen-containing organic cations, elements from the alkali family (Cs, K, Na, etc), crown ethers, diamines and any other template which is well known to the skilled person. In step b) of the first preparation process of the invention, element X is preferably selected from the group formed by aluminium, titanium, zirconium, niobium, germanium and gallium; more preferably, X is aluminium.

In a second implementation of the process for preparing said material with a hierarchical porosity, hereinafter termed the "second process for preparing said material with a hierarchical porosity", zeolitic crystals and/or related solids are initially used which have the characteristic of dispersing in the form of nanocrystals with a maximum nanometric dimension of 500 nm in solution, for example in acidic hydro-organic solution. The second process for preparing the material with a hierarchical porosity comprises:

a') mixing, in solution, at least one surfactant, at least one silicic precursor, optionally at least one precursor of at least one element X selected from the group constituted by aluminium, titanium, tungsten, zirconium, gallium, germanium, phosphorus, tin, antimony, lead, vanadium, iron, manganese, hafnium, niobium, tantalum and yttrium, and zeolitic crystals and/or related solids dispersing into the form of nanocrystals with a maximum nanometric dimension of 500 nm in said solution;

b') aerosol atomization of said solution obtained in step a') to result in the formation of spherical droplets with a diameter of less than 200 µm;

c') drying said droplets; and d') eliminating at least said surfactant.

In step a') of the second process for preparing the material with hierarchical porosity, zeolitic crystals and/or related solids are used. Any crystalline zeolite or related solid developing acid properties which is known in the art and which has the property of dispersing in solution, for example in acidic hydro-organic solution, in the form of nanocrystals with a maximum nanometric dimension of 500 nm is suitable for carrying out step a'). Said zeolitic crystals and/or related solids are synthesized using methods which are known to the skilled person. The zeolitic crystals and/or related solids used in step a') may already be in the form of nanocrystals. Zeolitic crystals and/or related solids with a dimension of more than 500 nm, for example in the range 500 nm to 200 µm can also advantageously be used if they disperse in solution, for example in hydro-organic solution, preferably in acidic hydro-organic solution, in the form of nanocrystals with a maximum nanometric dimension of 500 nm Zeolitic crystals and/or related solids dispersing in the form of nanocrystals with a maximum nanometric dimension of 500 nm can also be obtained by functionalization of the nanocrystal surface. The element X is preferably selected from the group constituted by aluminium, titanium, zirconium, niobium, germanium and gallium; more preferably, X is aluminium. The zeolitic crystals and/or related solids used are either in their as synthesized form, i.e. still containing template, or in their calcined form, i.e. free of said template. When the zeolitic crystals and/or related solids used are in their as synthesized form, said template is eliminated during step d') of the second process for preparing the material with a hierarchical porosity.

According to the two processes for preparing said material with a hierarchical porosity, the silicic precursor and optional precursor of at least one element X, preferably the aluminium precursor, used in step b) of the first process for preparing said material with a hierarchical porosity, respectively in step a') of the second process for preparing said material with a hierarchical porosity, are precursors of inorganic oxides which are well known to the skilled person. The silicic precursor is obtained from any source of silicon and advantageously from a sodium silicate precursor with formula $SiO_2$, NaOH, from a chlorine-containing precursor with formula $SiCl_4$, from an organometallic precursor with formula $Si(OR)_4$ in which R=H, methyl, ethyl or from a chloroalkoxide precursor with formula $Si(OR)_{4-x}Cl_x$ in which R=H, methyl, ethyl, x being in the range 0 to 4. The silicic precursor may also advantageously be an organometallic precursor with formula $Si(OR)_4—R'_x$ in which R=H, methyl, ethyl and R' is an alkyl chain or a functionalized alkyl chain, for example a thiol, amino, β diketone or sulphonic acid group, x being in the range 0 to 4. The precursor for element X may be any compound comprising the element X which can liberate said element in solution, for example in hydro-organic solution, preferably in acidic hydro-organic solution, in the reactive form. In the preferred case in which X is aluminium, the aluminium precursor is advantageously an inorganic aluminium salt with formula $AlZ_3$, Z being a halogen or the $NO_3$ group. Preferably, Z is chlorine. The aluminium precursor may also be an organometallic precursor with formula $Al(OR'')_3$ in which R''=ethyl, isopropyl, n-butyl, s-butyl or t-butyl or a chelated precursor such as aluminium acetylacetonate ($Al(CH_7O_2)_3$). The aluminium precursor may also be an aluminium oxide or hydroxide.

The surfactant used to prepare the mixture of step b) of the first process for preparing said material with a hierarchical porosity or step a') of the second process for preparing said material with a hierarchical porosity is an ionic or non-ionic surfactant or a mixture of the two. Preferably, the ionic surfactant is selected from phosphonium or ammonium ions, and more preferably from quaternary ammonium salts such as acetyltrimethyl ammonium bromide (CTAB). Preferably, the non-ionic surfactant may be any copolymer having at least two portions with different polarities endowing them with amphiphilic macromolecular properties. Said copolymers may be included in the following non exhaustive list of copolymer classes: fluorinated copolymers (—[CH$_2$—CH$_2$—CH$_2$—CH$_2$O—CO—R1]— in which R1=C$_4$F$_9$, C$_8$F$_{17}$, etc), biological copolymers such as poly amino acids (polylysine, alginates, etc), dendrimers, block copolymers constituted by chains of poly(alkylene oxide) and any other copolymer with an amphiphilic nature which is known to the skilled person (S Forster, M Antionnetti, Adv Mater, 1998, 10, 195-217, S Forster, T Plantenberg, Angew Chem Int Ed, 2002, 41, 688-714, H Colfen, Macromol Rapid Commun, 2001, 22, 219-252). Preferably, in the context of the present invention, a block copolymer constituted by poly (alkylene oxide) chains is used. Said block copolymer is preferably a block copolymer having two, three of four blocks, each block being constituted by one poly(alkylene oxide) chain. For a two-block copolymer, one of the blocks is constituted by a poly(alkylene oxide) chain which is hydrophilic in nature and the other block is constituted by a poly(alkylene oxide) chain which is hydrophobic in nature. For a three-block copolymer, two of the blocks are constituted by a poly(alkylene oxide) chain which is hydrophilic in nature while the other block, located between two blocks with hydrophilic portions, is constituted by a poly(alkylene oxide) chain which is hydrophobic in nature. Preferably, in the case of a three-block copolymer, the chains of poly(alkylene oxide) of hydrophilic nature are chains of poly(ethylene oxide), (PEO)$_x$ and (PEO)$_z$, and the poly(alkylene oxide) chains which are hydrophobic in nature are chains of poly (propylene oxide), (PPO)$_y$, chains of poly(butylene oxide) or mixed chains, each chain of which is a mixture of several alkylene oxide monomers. Most preferably, in the case of a three-block copolymer, a compound with formula (PEO)$_x$(PPO)$_y$(PEO)$_z$ is used in which x is in the range 5 to 300, y is in the range 33 to 300 and z is in the range 5 to 300. Preferably, the values of x and z are identical. Highly advantageously, a compound in which x=20, y=70 and z=20 (P123) is used and a compound in which x=106, y=70 and z=106 (F127) is used. Commercially available non-ionic surfactants known as Pluronic (BASF), Tetronic (BASF), Triton (Sigma), Tergitol (Union Carbide), Brij (Aldrich) can be used as non-ionic surfactants in step b) of the first process for preparing a material with hierarchical porosity comprising silicon constituting the catalyst of the invention, or in step a') of the second process for preparing said material with a hierarchical porosity. For a four-block copolymer, two of the blocks are constituted by a poly(alkylene oxide) chain which is hydrophilic in nature and the two other blocks are constituted by a poly(alkylene oxide) chain which is hydrophobic in nature.

The solution into which the following are mixed: at least one silicic precursor, optionally at least one precursor of at least one element X, preferably an aluminium precursor, at least one surfactant and, in the case of step b) of the first process for preparing said material with a hierarchical porosity, the colloidal solution in which said synthesized zeolitic nanocrystals are dispersed, or in the case of step a') of the second process for preparing said material with a hierarchical porosity, zeolitic crystals and/or related solids are dispersed in said solution in the form of nanocrystals with a maximum nanometric dimension of 500 nm, may be acidic, neutral or basic. Preferably, said solution is acidic and has a maximum pH of 2, more preferably in the range 0 to 2. Non-limiting examples of acids used to obtain an acidic solution with a maximum pH of 2 are hydrochloric acid, sulphuric acid and nitric acid. Said solution may be aqueous or it may be a water-organic solvent mixture, the organic solvent preferably being a polar solvent, in particular an alcohol, preferably ethanol. Said solution may also be practically organic, preferably practically alcoholic, the quantity of water being such that hydrolysis of the inorganic precursors is ensured (stoichiometric quantity). Most preferably, said solution in which the following are mixed: at least one silicic precursor, optionally at least one precursor of at least one element X, preferably an aluminium precursor, at least one surfactant and, in the case of step b) of the first process for preparing said material with a hierarchical porosity, the colloidal solution in which said synthesized zeolitic nanocrystals are dispersed, or in the case of step a') of the second process for preparing said material with a hierarchical porosity the zeolitic crystals and/or related solids are dispersed in said solution in the form of nanocrystals with a maximum nanometric dimension of 500 nm, is a hydro-organic acid mixture, more preferably an acidic water-alcohol mixture.

In the preferred case in which the matrix of the material with a hierarchical porosity of the invention contains aluminium, the concentrations of silicic and aluminium precursors in step b) of the first process for preparing said material with a hierarchical porosity or in step a') of the second process for preparing said material with a hierarchical porosity are defined by the molar ratio Si/Al, this being at least equal to 1, preferably in the range 1 to 1000, and more preferably in the range 1 to 100. The quantity of zeolitic nanocrystals dispersed in the colloidal solution introduced during step b) of the first process for preparing said material with a hierarchical porosity, or that of the zeolitic crystals and/or related solids introduced during step a') of the second process for preparing said material with a hierarchical porosity is such that the zeolitic nanocrystals advantageously represent 0.1% to 40% by weight, preferably 0.1% to 20% by weight and more preferably 0.1% to 10% by weight of said material with a hierarchical porosity.

The initial concentration of surfactant introduced into the mixture of step b) of the first process for preparing said material with a hierarchical porosity or step a') of the second process for preparing said material with a hierarchical porosity is defined by $c_0$ which is defined with respect to the critical micellar concentration ($c_{mc}$) which is well known to the skilled person. The $c_{mc}$ is the limiting concentration beyond which self-arrangement of the molecules of surfactant in the solution occurs. The concentration $c_0$ may be less than, equal to or more than $c_{mc}$; preferably, it is less than $c_{mc}$. In a preferred implementation of one or the other of the processes for preparing said material with a hierarchical porosity, the concentration $c_0$ is less than the $c_{mc}$ and said solution in step b) of the first process for preparing said material with a hierarchical porosity or in step a') of the second process for preparing said material with a hierarchical porosity is an acidic water-alcohol acidic mixture.

The step for atomizing a mixture in step c) of the first process for preparing said material with a hierarchical porosity or in step b') of the second process for preparing said material with a hierarchical porosity produces spherical droplets with a diameter which is preferably in the range 2 to 200 μm. The size distribution of said droplets is of the log-normal type. The aerosol generator used is a commercial model 3078 type apparatus supplied by TSI. The solution is atomized in a chamber into which a vector gas is sent, an O$_2$/N$_2$ mixture (dry air), at a pressure P of 1.5 bars. In step d) of the first process for preparing said material with a hierarchical porosity, or in step c') of the second process for preparing said material with a hierarchical porosity, said droplets are dried. Drying is carried out by transporting said droplets via the vector gas, the O$_2$/N$_2$ mixture, in glass tubes, which results in progressive evaporation of the solution, for example of the hydro-organic acid solution, and hence to the production of elementary spherical particles. Drying is completed by passing said particles into an oven the temperature of which can be adjusted, usually between temperatures of 50° C. to 600° C. and preferably 80° C. to 400° C., the residence time for said particles in the oven being of the order of 3 to 4 seconds. The particles are then harvested in a filter and constitute the material with a hierarchical porosity comprising silicon and present in the catalyst of the invention. A pump placed at the end of the circuit routes the species into the experimental aerosol device.

In the case in which the solution in step b) of the first process for preparing said material with a hierarchical porosity or step a') of the second process for preparing said material with a hierarchical porosity is a water-organic solvent mixture, preferably acidic, it is essential during step b) of the first process for preparing said material with a hierarchical porosity or step a') of the second process for preparing said material with a hierarchical porosity that the concentration of surfactant at the start of mesostructuring of the matrix is less than the critical micellar concentration so that evaporation of said hydro-organic solution, preferably acidic, during step c) of the first process for preparing said material with a hierarchical porosity or step b') of the second process for preparing said material with a hierarchical porosity using the aerosol technique induces a phenomenon of micellization or self-organization leading to mesostructuring of the matrix of material with a hierarchical porosity of the invention around the zeolitic nanocrystals which remain unchanged in form and size during steps c) and d) of the first process for preparing said material with a hierarchical porosity or b') and c') of the second process for preparing said material with a hierarchical porosity. When $c_0 < c_{mc}$, mesostructuring of the matrix of the material with a hierarchical porosity of the invention prepared using one of the processes described above follows progressive concentration of the silicic precursor in each droplet, of the optional precursor of element X, preferably the aluminium precursor and of the surfactant, until a concentration of surfactant $c > c_{mc}$ results from evaporation of the hydro-organic solution, preferably acidic. In general, increasing the joint concentration of the silicic precursor and possibly of the precursor for element X, preferably of an aluminium precursor, and the surfactant causes precipitation of the silicic precursor and of the optional precursor for element X, preferably the aluminium precursor, around the self-organized surfactant and as a consequence, structuring of the matrix of said material with a hierarchical porosity. The inorganic/inorganic phase, organic/organic phase and organic/inorganic phase interactions result in a self-organization mechanism which is cooperative with hydrolysis/condensation of the silicic precursor and optional precursor for the element X, preferably an aluminium precursor, around the surfactant. During said self-organizing phenomenon, the zeolitic nanocrystals are trapped in the matrix based on silicon oxide, which is mesostructured, comprised in each of the elementary spherical particles constituting the material with a hierarchical porosity. The aerosol technique is particularly advantageous for carrying out step c) of the first process for preparing said material with a hierarchical porosity or step b') of the second process for preparing said material with a hierarchical porosity to constrain the reagents present in the initial solution to interact together, with no possible loss of material apart from the solvents, i.e. the solution, preferably the aqueous solution, preferably acidic, and optionally supplemented with a polar solvent, the totality of the silicon, optional element X, and the zeolitic nanocrystals initially present then being perfectly preserved throughout each of the processes for preparation of a material with a hierarchical porosity of the invention instead of potentially being eliminated during the filtering steps and washes encountered in conventional synthesis processes known to the skilled person. Drying the droplets in step d) of the first process for preparing said material with a hierarchical porosity or in step c') of the second process for preparing said material with a hierarchical porosity is advantageously followed by passage through an oven at a temperature in the range 50° C. to 150° C. Elimination of the template and the surfactant in step e) of the first process for preparing said material with a hierarchical porosity or elimination of at least the surfactant in step d') of the second process for preparing said material with a hierarchical porosity to obtain the material with a hierarchical porosity of the invention is advantageously carried out by chemical extraction or heat treatment and preferably by calcining in air within a temperature range of 300° C. to 1000° C. and more precisely in a range of 500° C. to 600° C. for a period of 1 to 24 hours and preferably for a period of 2 to 6 hours.

The material with a hierarchical porosity comprising silicon and present in the catalyst of the invention may be obtained in the form of powder, sieved crushed compacted powder, ground powder, suspension, beads, pellets, wheels, tablets, spheres, granules or extrudates, the forming operations being carried out using conventional techniques which are known to the skilled person (for example by extrusion, pelletization, the oil drop coagulation method, rotary plate granulation, etc). In particular, it is possible to add an amorphous or low crystallinity oxide type amorphous porous mineral binder to said material with a hierarchical porosity. Said porous mineral binder, normally amorphous, is generally constituted by at least one refractory oxide selected from the group formed by alumina, silica, clays, titanium oxide, boron oxide and zirconia. The binder may be constituted by a mixture of at least two of the oxides cited above, for example an aluminosilicate. Aluminates may also be selected. Preferably, binders containing alumina are used in all of its forms known to the skilled person, for example gamma alumina. It is also advantageously possible to use mixtures of alumina and silica, mixtures of alumina and aluminosilicate. Preferably, said material with a hierarchical porosity is obtained in the form of a powder, a sieved compacted crushed powder, or extrudates, constituted by elementary spherical particles with a maximum diameter of 100 µm.

It should be noted that steps e) of the first process for preparing said material with a hierarchical porosity and d') of the second process for preparing said material with a hierarchical porosity may be carried out before or after any step for forming as described above of said material with a hierarchical porosity and comprising silicon, as well as any step for preparing the catalyst of the invention described below.

The catalyst of the invention is prepared using a process comprising mixing said material with a hierarchical porosity with at least one active phase containing at least one hydro-dehydrogenating element from group VIB and/or VIII.

The material with a hierarchical porosity present in the catalyst of the invention is calcined during preparation of said catalyst, advantageously prior to mixing with said active phase. The calcining treatment is normally carried out in air at a temperature of at least 150° C., preferably at least 300° C., more preferably between approximately 350° C. and 1000° C. and more preferably in the range 350° C. to 800° C. In the remainder of the text, said material with a hierarchical porosity which may be formed and may optionally have undergone a heat treatment will be termed the "support" of the catalyst of the invention.

The elements from groups VIB and/or elements from group VIII and optionally those selected from phosphorus, boron, silicon and optionally elements from groups VB and VIIB may optionally be introduced, all or in part, before, during or after forming said material with a hierarchical porosity using any method which is known to the skilled person. Said elements may be introduced after forming said material with a hierarchical porosity and after or before drying and calcining said formed material.

In a preferred mode of carrying out the process for preparing the catalyst of the invention, the active phase containing at least one hydrodehydrogenating element from group VIB and/or VIII, optional elements selected from phosphorus, boron, silicon and optional elements from groups VB and VIIB may be introduced during forming of said material with a hierarchical porosity.

In another preferred mode of carrying out the process for preparing the catalyst of the invention, the active phase containing at least one hydrodehydrogenating element from group VIB and/or VIII, optional elements selected from phosphorus, boron, silicon and optional elements from groups VB and VIIB may be introduced by one or more operations for impregnating the support using a solution containing precursors of these elements.

The metal(s) is/are preferably introduced by impregnation of the support.

Preferably, the support is impregnated using an aqueous solution. The support is preferably impregnated using the "dry" impregnation method which is well known to the skilled person. Impregnation may be carried out in a single step using a solution containing all of the constituent elements of the final catalyst.

In the case in which the catalyst of the present invention contains a metal from group VIII and a metal from group VIB, the group VIII metals are preferably introduced using one or more operations for impregnating the formed and calcined support after those from group VIB or at the same time thereof.

In accordance with another preferred mode of carrying out the process for preparing the catalyst of the present invention, the boron and silicon may also be deposited simultaneously using, for example, a solution containing a boron salt and a silicone type silicon compound.

Impregnation of niobium may be facilitated by adding oxalic acid and possibly ammonium oxalate to the solutions of niobium oxalate. Other compounds may be used to improve the solubility and facilitate impregnation of niobium, as is well known to the skilled person.

In the particular case of obtaining the final catalyst of the invention in the form of extrudates, it is advantageous to prepare catalysts with concentrations of elements from groups VIB and/or elements from group VIII, and optionally phosphorus, boron, silicon and possibly elements from groups VB and VIIB which are homogeneous throughout them. It is also advantageous to prepare catalysts with concentrations of elements from groups VIB and/or elements from group VIII, and optionally phosphorus, boron, silicon and optionally elements from groups VB and VIIB which differ at the core and at the periphery. These catalysts have distribution profiles which are termed "dished" or "domed". Another type of distribution is the crust type where the elements of the active phase are distributed at the surface.

In general, the core/edge ratio of the concentrations of elements from groups VIB and/or elements from group VIII, and optionally phosphorus, boron, silicon and optional elements from groups VB, and VIIB is in the range 0.1 to 3. In one variation of the invention, it is in the range 0.8 to 1.2. In another variation of the invention, it is in the range 0.3 to 0.8.

The metals from group VIB and group VIII of the catalyst of the present invention may be present either completely or partially in the form of the metal and/or oxide and/or sulphide.

Sources of molybdenum and tungsten include oxides and hydroxides, molybdic acids and tungstic acids and salts thereof, in particular ammonium salts such as ammonium molybdate, ammonium heptamolybdate, ammonium tungstate, phosphomolybdic acid, phosphotungstic acid and salts thereof, silicomolybdic acid, silicotungstic acid and salts thereof. Preferably, oxides and ammonium salts are used, such as ammonium molybdate, ammonium heptamolybdate or ammonium tungstate.

The sources of elements from group VIII which may be used are well known to the skilled person. As an example, for non noble metals, nitrates such as cobalt nitrate, nickel nitrate, sulphates, hydroxides such as cobalt hydroxides, nickel hydroxides, phosphates, halides (for example chlorides, bromides and fluorides), carboxylates (for example acetates and carbonates) are used. For noble metals, halides, for example chlorides, nitrates such as palladium nitrate, acids such as chloroplatinic acid, and oxychlorides such as ammoniacal ruthenium oxychloride are used.

The preferred source of phosphorus with the phosphorus being used as a doping element is orthophosphoric acid, $H_3PO_4$, but its salts and esters such as ammonium phosphates are also suitable. The phosphorus may, for example, be introduced in the form of a mixture of phosphoric acid and a basic organic compound containing nitrogen such as ammonia, primary and secondary amines, cyclic amines, compounds from the pyridine family and quinolines and compounds from the pyrrole family. Tungsto-phosphoric or tungsto-molybdic acids may be employed.

The amount of phosphorus, the phosphorus being used as a doping element, is adjusted, without in any way limiting the scope of the invention, so as to form a mixed compound in solution and/or on the support, for example tungsten-phosphorus or molybdenum-tungsten-phosphorus. These mixed compounds may be heteropolyanions. These compounds may be Anderson heteropolyanions, for example.

The source of boron, namely the boron used as a doping element, may be boric acid, preferably orthoboric acid, $H_3BO_3$, ammonium biborate or pentaborate, boron oxide, or boric esters. The boron may, for example, be introduced in the form of a mixture of boric acid, hydrogen peroxide and a basic organic compound containing nitrogen such as ammonia, primary or secondary amines, cyclic amines, compounds from the pyridine family and quinolines and compounds from the pyrrole family. The boron may, for example, be introduced using a boric acid solution in a water/alcohol mixture.

Many sources of silicon, the silicon being used as a doping agent, may be used. Thus, it is possible to use the tetraethylorthosilicate $Si(OEt)_4$, siloxanes, polysiloxanes, silicones, silicone emulsions, halogen silicates such as ammonium fluorosilicate $(NH_4)_2SiF_6$ or sodium fluorosilicate $Na_2SiF_6$. Silicomolybdic acid and its salts, or silicotungstic acid and its salts may also advantageously be used. The silicon may, for example, be added by impregnating ethyl silicate in solution in a water/alcohol mixture. The silicon may, for example, be added by impregnation of a silicone or silicic acid type silicon compound suspended in water.

The source of elements from group VB which may be used are well known to the skilled person. As an example, the niobium sources which may be used include oxides such as diniobium pentoxide $Nb_2O_5$, niobic acid $Nb_2O_5, H_2O$, niobium hydroxides and polyoxoniobates, niobium alkoxides with formula $Nb(OR_1)_3$ where $R_1$ is an alkyl radical, niobium oxalate $NbO(HC_2O_4)_5$, or ammonium niobate. Preferably, niobium oxalate or ammonium niobate is used.

Sources of elements from group VIIA which may be used are well known to the skilled person. As an example, the fluoride anions may be introduced in the form of hydrofluoric acid or salts thereof. Said salts are formed with alkali metals, ammonium or an organic compound. In this latter case, the salt is advantageously formed in the reaction mixture by reaction between the organic compound and hydrofluoric acid. It is also possible to use hydrolysable compounds which can liberate fluoride anions into the water, such as ammonium fluorosilicate $(NH_4)_2SiF_6$, silicon tetrafluoride $SiF_4$ or sodium hexafluoride $Na_2SiF_6$. The fluorine may, for example, be introduced by impregnation of an aqueous solution of hydrofluoric acid or ammonium fluoride.

Impregnation of the material with a hierarchical porosity with the active phase and any metals from group VB, VIIB and those selected from Si, B, P is followed by drying at a temperature in the range 50° C. to 300° C. and calcining at a temperature in the range 300° C. to 1000° C. and more precisely between 500° C. and 600° C. for a period of 1 to 24 hours and preferably for a period of 2 to 6 hours.

The catalysts of the invention may be manufactured and used in the form of a powder, a sieved crushed compacted powder, pellets, granules, tablets, rings, beads, wheels, spheres or extrudates, preferably in the form of a sieved crushed compacted powder, spheres or extrudates. However, it is advantageous that the catalyst be in the form of extrudates with a diameter in the range 0.5 to 5 mm and more particularly in the range 0.7 to 2.5 mm. The forms are cylindrical (which may or may not be hollow), twisted cylinders, multi-lobed (2, 3, 4 or 5 lobes, for example), or rings. The cylindrical form is preferably used, but any other form may be used.

Processes for Treating Hydrocarbon Feeds in Accordance with the Invention

The invention also pertains to processes for the treatment of hydrocarbon cuts using the catalyst of the invention.

More particularly, the invention pertains to a process for hydrocracking and/or hydroconversion as well as to a process for hydrotreatment of hydrocarbon feeds using the catalyst of the invention.

The hydrocracking and/or hydroconversion process and the hydrotreatment process of the invention are operated in the presence of hydrogen, at a temperature of more than 200° C., at a pressure of more than 1 MPa, the space velocity being in the range 0.1 to 20 $h^{-1}$ and the quantity of hydrogen introduced being such that the volume ratio of liters of hydrogen/liters of hydrocarbon is in the range 80 to 5000 l/l.

The catalysts of the invention are advantageously used for hydrocracking and/or hydroconversion of hydrocarbon cuts.

The catalysts of the invention may be used for the hydrotreatment of hydrocarbon feeds, said hydrotreatment process may be placed alone or upstream of a hydrocracking and/or hydroconversion process on a hydrocracking catalyst based on zeolite or alumina-silica, preferably comprising nickel and tungsten.

Sulphurization of Catalysts.

Prior to injecting the feed, the catalysts used in the process of the present invention preferably initially undergo a sulphurization treatment to transform at least a portion of the metallic species into the sulphide before they are brought into contact with the feed to be treated. This treatment for activation by sulphurization is well known to the skilled person and may be carried out using any method which is already described in the literature, either in situ, i.e. in the reactor, or ex situ.

The conventional sulphurization method which is well known to the skilled person consists of heating the catalyst in the presence of hydrogen sulphide (pure or, for example, in a stream of a mixture of hydrogen/hydrogen sulphide) at a temperature in the range 150° C. to 800° C., preferably in the range 250° C. to 600° C., generally in a traversed bed reaction zone.

Reduction of Catalysts Based on Noble Metals

Prior to injecting the feed, the hydrocracking catalyst based on noble metals may initially undergo a reduction treatment to transform at least a portion of the oxides of noble metals into reduced noble metals. One preferred method for reducing the catalyst is a treatment in hydrogen at a temperature in the range 150° C. to 650° C. and at a total pressure in the range 0.1 to 20 MPa. It should also be noted that any ex situ reduction method may be suitable. As an example, a reduction may include holding at a temperature of 150° C. for 2 hours, followed by raising the temperature to 350° C. at 1° C. per minute, then maintaining at 350° C. for 2 hours. During this reduction treatment, the hydrogen flow rate may be 1000 liters of hydrogen per liter of catalyst.

Feeds

Highly varied feeds may be treated using the processes of the invention described above. In general, they contain at least 20% by volume and usually at least 80% by volume of compounds boiling above 340° C.

The feed may, for example, be LCOs (light cycle oil) (light gas oils from a catalytic cracking unit), atmospheric distillates, vacuum distillates, for example gas oils from straight run distillation of crude or conversion units such as FCC, coker or visbreaking, as well as feeds deriving from units for extracting aromatics from lubricating base oils or from units for solvent dewaxing from lubricating base oils, or distillates deriving from processes for desulphurization or hydroconversion in a fixed or ebullated bed or ARs (atmosphere residues) and/or VRs (vacuum residues) and/or deasphalted residues, or the feed may be a deasphalted oil or any mixture of the feeds cited above. The above list is not limiting. Paraffins from the Fischer-Tropsch process are excluded.

In general, the feeds have a T5 boiling point of more than 340° C., and preferably more than 370° C., i.e. 95% of the compounds present in the feed have a boiling point of more than 340° C., preferably more than 370° C.

The nitrogen content of the feeds treated in the processes of the invention is usually more than 500 ppm by weight, preferably in the range 500 to 10000 ppm by weight, more preferably in the range 700 to 4000 ppm by weight and still more preferably in the range 1000 to 4000 ppm by weight. The sulphur content of the feeds treated in the processes of the invention is usually in the range 0.01% to 5% by weight, preferably in the range 0.2% to 4% by weight and still more preferably in the range 0.5% to 2% by weight.

The feed may optionally contain metals. The cumulative nickel and vanadium content of the feeds treated using the processes of the invention is preferably less than 1 ppm by weight.

The asphaltenes content is generally less than 3000 ppm by weight, preferably less than 1000 ppm by weight, and more preferably less than 200 ppm by weight.

Guard Beds

In the case in which the feed contains resin and/or asphaltene type compounds, it is advantageously to first pass the feed over a bed of catalyst or adsorbant which is different from the hydrocracking and/or hydroconversion or hydrotreatment catalyst. The catalysts or guard beds used in accordance with the invention are in the form of spheres or extrudates. However, it is advantageous for the catalyst to be in the form of extrudates with a diameter in the range 0.5 to 5 mm, more particularly in the range 0.7 to 2.5 mm. The forms are cylinders (which may or may not be hollow), twisted cylinders, multilobed (2, 3, 4 or 5 lobes, for example), or rings. The cylindrical form is preferred, but any other form may be used.

To accommodate the presence of contaminants and/or poisons in the feed, the guard catalysts may, in a further preferred implementation, have more particular geometrical forms to increase their void fraction. The void fraction of said catalysts is in the range 0.2 to 0.75. Their external diameter may be between 1 and 35 mm Possible particular non-limiting forms are: hollow cylinders, hollow rings, Raschig rings, toothed hollow cylinders, crenellated hollow cylinders, pentaring cartwheels, multiple holed cylinders, etc.

These catalysts or guard beds used in accordance with the invention may or may not have been impregnated with an active phase. Preferably, the catalysts are impregnated with a hydrodehydrogenating phase. Highly preferably, the CoMo or NiMo phase is used.

These catalysts or guard beds of the invention may exhibit macroporosity. The guard beds may be those sold by Norton-Saint-Gobain, for example MacroTrap® guard beds. The guard beds may be those sold by Axens from the ACT family: ACT077, ACT935, ACT961 or HMC841, HMC845, HMC941 or HMC945. It may be particularly advantageous to superimpose these catalysts in at least two different beds of varying heights. The catalysts with the highest void ratio are preferably used in the first catalytic bed or beds at the inlet to the catalytic reactor. It may also be advantageous to use at least two different reactors for said catalysts.

Preferred guard beds of the invention are HMC and ACT961.

Operating Conditions

The operating conditions such as temperature, pressure, hydrogen recycled rate, hourly space velocity, may vary widely as a function of the nature of the feed, the desired quality of the products and the facilities available to the refiner. The hydrocracking/hydroconversion or hydrotreatment catalyst is generally brought into contact with the feeds described above in the presence of hydrogen, at a temperature of more than 200° C., often in the range 250° C. to 480° C., advantageously in the range 320° C. to 450° C., preferably in the range 330° C. to 435° C., at a pressure of more than 1 MPa, usually in the range 2 to 25 MPa, preferably in the range 3 to 20 MPa, the space velocity being in the range 0.1 to 20 $h^{-1}$ and preferably 0.1-6 $h^{-1}$, preferably 0.2-3 $h^{-1}$, and the quantity of hydrogen introduced is such that the volume ratio of liters of hydrogen/liters of hydrocarbon is in the range 80 to 5000 l/l and usually in the range 100 to 2000 l/l.

These operating conditions used in the processes of the invention can generally reach conversions per pass into products with boiling points of less than 340° C., preferably less than 370° C., of more than 15% and more preferably in the range 20% to 95%.

Implementations

The hydrocracking and/or hydroconversion processes employing the catalysts of the invention cover the fields of pressure and conversion from mild hydrocracking to high pressure hydrocracking. The term "mild hydrocracking" means hydrocracking resulting in moderate conversions, generally less than 40%, and operating at low pressure, generally in the range 2 MPa to 6 MPa.

The catalyst of the present invention may be used alone, in a single or in several catalytic beds in fixed bed mode, in one or more reactors, in a hydrocracking operation termed a once-through process, with or without liquid recycling of the non-converted fraction, optionally in combination with a hydrorefining catalyst located upstream of the catalyst of the present invention.

The catalyst of the present invention may be used alone, in one or several ebullated bed reactors, in a hydrocracking operation termed a once-through process, with or without liquid recycling of the non converted fraction, optionally in combination with a hydrorefining catalyst located in a fixed bed reactor or in an ebullated bed reactor upstream of the catalyst of the present invention.

The ebullated bed functions withdrawal of the used catalyst and daily addition of fresh catalyst in order to keep the activity of the catalyst stable.

Once-Through Process

Hydrocracking termed a once-through process comprises in the first instance and in general manner a deep hydrorefining which is intended to carry out hydrodenitrogenation and deep desulphurization of the feed before it is sent to the hydrocracking catalyst proper, in particular in the case in which it includes a zeolite. This deep hydrorefining of the feed results in only limited conversion of the feed into lighter fractions, which is not enough and thus has to be completed on a more active hydrocracking catalyst. However, it should be noted that no separation is involved between the two types of catalyst. All of the effluent from the reactor outlet is injected onto the hydrocracking catalyst proper and it is only then that separation of the products formed is carried out. This version of hydrocracking, termed once-through, has a variation which involves recycling the non converted fraction to the reactor with a view to deeper conversion of the feed.

Fixed Bed Once-Through Process

For catalysts with a low silica content, the quantities by weight of silica of the support forming part of the composition of the catalyst are in the range 5% to 30% and preferably in the range 5% to 20%.

For catalysts with a high silica content, the quantities by weight of silica of the support forming part of the composition of the catalyst are in the range 20% to 80%, preferably in the range 30% to 60%.

When the catalyst of the present invention is used upstream of a zeolitic hydrocracking catalyst, for example based on Y zeolite, advantageously a catalyst is used which has a low silica weight content as defined above. It could also advantageously be used in combination with a hydrorefining catalyst, this latter being located upstream of the catalyst of the present invention.

When the catalyst of the present invention is used upstream of a hydrocracking catalyst based on alumina-silica or based on zeolite, in the same reactor in distinct catalytic beds or in distinct reactors, the conversion is generally (or preferably) less than 50% by weight and preferably less than 40%.

The catalyst of the invention may be used upstream or downstream of the zeolitic catalyst. Downstream of the zeolitic catalyst, it can crack PAHs. The term PAH means polyaromatic hydrocarbons such as those described in the work "Hydrocracking, Science and Technology" by J Scherzer, published by M Dekker Inc, 1996.

Ebullated Bed Once-Through Process

The catalyst of the invention may be used alone or in one or more reactor(s).

In the context of such a process, it may be advantageous to use several reactors in series, the ebullated bed reactor or reactors containing the catalyst of the invention being preceded by one or more reactor(s) containing at least one fixed bed or ebullated bed hydrorefining catalyst.

When the catalyst of the present invention is used downstream of a hydrorefining catalyst, conversion of the fraction of the feed occasioned by said hydrorefining catalyst is generally (or preferably) less than 30% by weight and preferably less than 25%.

Fixed Bed Once-Through Process with Intermediate Separation

The catalyst of the present invention may also be used in a once-through hydrocracking process comprising a hydrorefining zone, a zone allowing partial elimination of ammonium, for example by hot flash, and a zone comprising a hydrocracking catalyst. This process for hydrocracking hydrocarbon feeds in a single step for the production of middle distillates and possibly base oils comprises at least one first hydrorefining reaction zone, and at least one second reaction zone, in which hydrocracking of at least a portion of the effluent from the first reaction zone is carried out. This process also comprises incomplete separation of the ammonia from the effluent leaving the first zone. This separation is advantageously carried out using an intermediate hot flash. The hydrocracking carried out in the second reaction zone is carried out in the presence of ammonia in a quantity smaller than the quantity present in the feed, preferably less than 1500 ppm by weight, more preferably less than 1000 ppm by weight and still more preferably less than 800 ppm by weight of nitrogen. The catalyst of the present invention is preferably used in the hydrocracking reaction zone in combination or not in combination with a hydrorefining catalyst located upstream of the catalyst of the present invention.

The catalyst of the invention may also be used in the first reaction zone for converting pre-treatment, alone or in combination with a conventional hydrorefining catalyst, located upstream of the catalyst of the invention, in one or more catalytic beds in one or more reactor(s).

Once-Through Hydrocracking Process with Preliminary Hydrorefining on a Low Acidity Catalyst The catalyst of the invention may be used in a hydrocracking process comprising:
- a first hydrorefining reaction zone in which the feed is brought into contact with at least one hydrorefining catalyst having, in the standard activity test defined in French patent FR-2 840 621 as well as in U.S. patent application Ser. No. 04/004,888, a degree of cyclohexane conversion of less than 10% by weight;
- a second hydrocracking reaction zone in which at least a portion of the effluent from the hydrorefining step is brought into contact with at least one hydrocracking catalyst having, in the standard activity test, a degree of cyclohexane conversion of more than 10% by weight, the catalyst of the invention being present in at least one of the two reaction zones.

The proportion of the catalytic volume occupied by the hydrorefining catalyst generally represents 20% to 45% of the total catalytic volume.

The effluent from the first reaction zone is at least in part, preferably completely, introduced into the second reaction zone of said process. Intermediate separation of the gas may be carried out, as described above.

The effluent from the outlet from the second reaction zone undergoes "final" separation (for example by atmospheric distillation followed by vacuum distillation) to separate the gas. At least one residual liquid fraction is obtained, essentially containing products the boiling point of which is generally more than 340° C., which may be recycled at least in part upstream of the second reaction zone of the process of the invention, and preferably upstream of the hydrocracking catalyst based on alumina-silica, with the aim of producing middle distillates.

The conversion of products with boiling points of less than 340° C. or less than 370° C. is at least 50% by weight.

Two-Step Process

In a hydrocracking operation termed a two-step process with intermediate separation between the two reaction zones, in a given step the catalyst of the present invention may be used in one or in both reactors in combination or not in combination with a hydrorefining catalyst located upstream of the catalyst of the present invention.

Two-step hydrocracking comprises a first step which, like the once-through process, is intended to carry out hydrorefining of the feed, but also to reach a conversion of the latter of the order of 40% to 60% in general. The effluent from the first step then undergoes separation (distillation) which is usually termed intermediate separation, which is intended to separate the conversion products from the unconverted fraction. In the second step of a two-step hydrocracking process, only the fraction of the feed not converted during the first step is treated. This separation means that a two-step hydrocracking process may be more selective for middle distillate (kerosene+diesel) than a once-through process. In fact, intermediate separation of the conversion process prevents them from being over-cracked to naphtha and gas in the second step on the hydrocracking catalyst. Further, it should be noted that the unconverted fraction of the feed treated in the second step generally contains very small amounts of $NH_3$ as well as organic nitrogen-containing compounds, in general less than 20 ppm by weight or even less than 10 ppm by weight.

The configurations of fixed bed or ebullated bed catalytic beds described in the case of a once-through process may be used in the first step of a two-step process whether the catalyst of the invention is used alone or in combination with a conventional hydrorefining catalyst.

For once-through processes and for the first step of two-step hydrocracking processes, the preferred catalysts of the invention are catalysts doped with non noble group VIII elements, more preferably catalysts based on nickel and tungsten and the preferred doping element is phosphorus.

The catalysts used in the second step of the two-step hydrocracking processes are preferably doped catalysts based on noble group VIII elements, more preferably catalysts based on platinum and/or palladium and the preferred doping element is phosphorus.

Hydrotreatment/Hydrorefining of Hydrocarbon Feeds in Accordance with the Invention The catalysts of the invention are used for hydrotreatment and hydrorefining of hydrocarbon feeds such as oil cuts, cuts derived from coal or hydrocarbons produced from natural gas, more particularly for hydrogenation, hydrodesulphurization, hydrodenitrogenation, hydrodeoxygenation, hydrodearomatization and hydrodemetallization of hydrocarbon feeds containing aromatic and/or olefinic and/or naphthenic and/or paraffinic compounds, said feeds optionally containing metals and/or nitrogen and/or oxygen and/or sulphur.

More particularly, the feeds used in the hydrotreatment processes are gasolines, gas oils, vacuum gas oils, atmospheric residues, vacuum residues, atmospheric distillates, vacuum distillates, heavy fuels, oils, waxes and paraffins, spent oils, deasphalted residues or crudes, feeds deriving from thermal or catalytic conversion processes and mixtures thereof. They generally contain heteroatoms such as sulphur, oxygen or nitrogen and/or at least one metal.

As recalled above, the catalysts of the invention may be used in a large number of hydrorefining or hydrotreatment applications. The operating conditions which may be applied in these processes are usually: a temperature of 200° C. to 450° C., preferably 250° C. to 440° C., a pressure of 1 to 25 MPa, preferably 1 to 18 MPa, an hourly space velocity of 0.1 to 20 $h^{-1}$, preferably 0.2 to 5 $h^{-1}$, a hydrogen/feed ratio, expressed as the volume of hydrogen measured under normal temperature and pressure conditions per volume of liquid feed, which is generally 80 l/l to 5000 l/l and usually 100 l/l to 2000 l/l.

The following examples illustrate the present invention without in any way limiting its scope.

EXAMPLES

In the examples below, the aerosol technique used is that described above in the disclosure of the invention.

Example 1

Preparation of a Catalyst C1 (Invention)

Forming Support S1

Preparation of material S1 with a hierarchical porosity constituted by zeolite nanocrystals of the ZSM-5 type (MFI) (Si/Al=50) in an amount of 3.7% of the final material weight and a purely silicic mesostructured matrix.

0.14 g of aluminium sec-butoxide was added to a solution containing 7 g of tetrapropyl ammonium hydroxide solution (TPAOH, 20%), 4.3 ml of water and 0.0092 g of sodium hydroxide. 6 g of TEOS (tetraethylorthosilicate) was then added to this solution which was stirred at ambient temperature to obtain a clear solution. The solution was placed in an oven at T=95° C. for 18 hours. A milky white colloidal suspension was obtained containing ZSM-5 zeolite nanocrystals with a mean dimension of 130 nm 400 µl of said solution was then added to a solution containing 30 g of ethanol, 15 ml of water, 4.5 g of TEOS, 0.036 ml of HCl and 1.4 g of F127 surfactant. The pH of the solution was adjusted to 2 with HCl. The ensemble was sent to the atomization chamber of an aerosol generator and the solution was atomized in the form of fine droplets under the action of the vector gas (dry air) introduced under pressure (P=1.5 bars) as described above. The droplets were dried using the protocol described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by nanocrystals of ZSM-5 zeolite trapped in a purely silicic matrix with an organized mesoporosity characterized by a vermicular structure. The nitrogen adsorption isothermal analysis produced a specific surface area in the final material of $S_{BET}$=480 $m^2/g$ and a pore size in the mesopore range characteristic of the purely silicic mesostructured matrix with $\phi$=6.2 nm Large angle XRD analysis produced a diffractogram characteristic of ZSM-5 zeolite (micropore dimension, measured by XRD, of the order of 0.55 nm). Small angle XRD showed a correlation peak associated with a vermicular organization of the mesostructured matrix. The Bragg relationship, 2d*sin(0.3)=1.5406, gave d=15 nm. The thickness of the amorphous walls of the purely silicic mesostructured matrix defined by e=d−$\phi$ was thus e=9 nm. A TEM image of the elementary spherical particles obtained indicated that the particle size was characterized by a diameter of 50 to 700 nm, with a particle size distribution being centred around 300 nm. The synthesised material was used in the form of a sieved crushed compacted powder.

Support S1 was thus produced.

Preparation of Hydrocracking Catalyst C1 of the Invention

Catalyst C1 was obtained by dry impregnation of the support S1 in the form of a sieved crushed compacted powder using an aqueous solution comprising tungsten and nickel salts. The tungsten salt was ammonium metatungstate $(NH_4)_6 H_2W_{12}O_{40}*4H_2O$ and that of nickel was nickel nitrate, $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C1 were respectively 24.7% and 3.6%.

The characteristics of catalyst C1 were as follows:

The BET surface area was 280 $m^2/g$.

The mean mesoporous diameter, measured by mercury porosimetry, was 5.5 nm

Example 2

Preparation of a Catalyst C2 (Invention)

Forming support S2

Preparation of an aluminosilicate material S2 with a hierarchical porosity constituted by zeolite nanocrystals of the ZSM-5 type (MFI) (Si/Al=50) in an amount of 10% of the final material weight and with a mesostructured aluminosilicate matrix (Si/Al=4)

0.14 g of aluminium tri-sec-butoxide was added to a solution containing 3.5 ml of TPAOH, 0.01 g of sodium hydroxide NaOH and 4.3 ml of water. After dissolving the aluminium alkoxide, 6 g of TEOS (tetraethylorthosilicate) was added. The solution was stirred at ambient temperature for 5 hours and autoclaved at T=95° C. for 12 h. The white solution obtained contained 135 nm ZSM-5 nanocrystals. The solution was centrifuged at 20000 rpm for 30 minutes. The solid was redispersed in water then centrifuged again at 20000 rpm for 30 minutes. This washing was carried out twice. The nanocrystals formed a gel which was oven dried overnight at 60° C. 0.461 mg of these crystals was redispersed in a solution containing 30 g of ethanol, 15 ml of water, 3.59 g of TEOS, 1.03 g of $AlCl_3.6H_2O$, 0.036 ml of HCl and 1.4 g of P123 surfactant by ultrasound agitation for 24 hours. The ensemble was sent to the atomization chamber of an aerosol generator as described above and the solution was atomized in the form of fine droplets under the action of the vector gas (dry air) introduced under pressure (P=1.5 bars) using the method described above. The droplets were dried using the protocol described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by nanocrystals of ZSM-5 zeolite trapped in an aluminosilicate matrix with an organized mesoporosity characterized by a vermicular structure. The nitrogen adsorption isothermal analysis produced a specific surface area in the final material of $S_{BET}$=478 $m^2/g$ and a pore size in the mesopore range characteristic of the mesostructured aluminosilicate matrix with $\phi$=4 nm Large angle XRD analysis produced a diffractogram characteristic of ZSM-5 zeolite (micropore dimension of the order of 0.55 nm). Small angle XRD showed a correlation peak associated with a vermicular organization of the mesostructured matrix. The Bragg relationship, 2d*sin(0.4)=1.5406, gave d=11 nm. The thickness of the amorphous walls of the aluminosilicate mesostructured matrix defined by e=d−ϕ was thus e=7 nm. A TEM image of the elementary spherical particles obtained indicated that the particle size was characterized by a diameter of 50 to 700 nm, with a particle size distribution being centred around 300 nm. The synthesised material was used in the form of a sieved crushed compacted powder.

Support S2 was thus produced.

Preparation of Hydrocracking Catalyst C2 of the Invention

Catalyst C2 was obtained by dry impregnation of the support S2 in the form of a sieved crushed compacted powder using an aqueous solution comprising tungsten and nickel salts. The tungsten salt was ammonium metatungstate $(NH_4)_6H_2W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C2 were respectively 24.5% and 3.5%.

The characteristics of catalyst C2 were as follows:

The BET surface area was 301 $m^2/g$.

The mean mesoporous diameter, measured by mercury porosimetry, was 3.8 nm

Example 3

Preparation of a Catalyst C3 (Invention)

Forming Support S3

Preparation of an aluminosilicate material S3 with a hierarchical porosity constituted by zeolite nanocrystals of the Y type (FAU) (Si/Al=1.7) in an amount of 3.7% of the final material weight and a purely silicic mesostructured matrix (Si/Al=4).

3.52 g of aluminium isopropoxide was added to 19.46 g of a solution of tetramethylammonium hydroxide (TMAOH, 40% by weight). It was stirred until completely dissolved. At the same time, 6.00 g of TEOS (tetraethylorthosilicate) was dissolved in 40 ml of water. The two solutions were then mixed with vigorous stirring for 30 min. This was sealed at ambient temperature for 18 hours without stirring then autoclaved at T=90° C. for 6 days. The colloidal suspension obtained contained 30 to 120 nm nanocrystals of Y zeolite. Once synthesis was complete, the crystals were recovered by centrifuging (20000 rpm for one hour), redispersed in water (ultrasound) then centrifuged again until the solution after re-dispersion had a pH of close to 7. The pH of the colloidal suspension of nanocrystals of Y zeolite was then adjusted to 9.5 by adding a 0.1% ammoniacal solution. 400 μl of this solution was then added to a solution containing 30 g of ethanol, 15 ml of water, 3.59 g of TEOS, 1.03 g of $AlCl_3.6H_2O$, 0.036 ml of HCl and 1.4 g of P123 surfactant by ultrasound agitation for 24 hours. The ensemble was sent to the atomization chamber of an aerosol generator as described above and the solution was atomized in the form of fine droplets under the action of the vector gas (dry air) introduced under pressure (P=1.5 bars) using the method described in the above disclosure of the invention. The droplets were dried using the protocol described in the invention described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by nanocrystals of Y zeolite trapped in an aluminosilicate matrix with an organized mesoporosity characterized by a vermicular structure. The nitrogen adsorption isothermal analysis produced a specific surface area in the final material of $S_{BET}$=478 $m^2/g$ and a pore size in the mesopore range characteristic of the mesostructured aluminosilicate matrix with ϕ=4 nm. Large angle XRD analysis produced a diffractogram characteristic of Y zeolite (micropore dimension of the order of 0.74 nm). Small angle XRD showed a correlation peak associated with a vermicular organization of the mesostructured matrix. The Bragg relationship, 2d*sin (0.4)=1.5406, gave d=11 nm. The thickness of the amorphous walls of the purely silicic mesostructured matrix, defined by e=d−ϕ, was thus e=7 nm. A TEM image of the elementary spherical particles obtained indicated that the particle size was characterized by a diameter of 50 to 700 nm, with a particle size distribution being centred around 300 nm. The synthesised material was used in the form of a sieved crushed compacted powder.

Support S3 was thus produced.

Preparation of Hydrocracking Catalyst C3 of the Invention

Catalyst C3 was obtained by dry impregnation of the support S3 in the form of a sieved crushed compacted powder using an aqueous solution comprising tungsten and nickel salts. The tungsten salt was ammonium metatungstate $(NH_4)_6H_2W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C3 were respectively 24.7% and 3.6%.

The characteristics of catalyst C3 were as follows:

The BET surface area was 295 $m^2/g$.

The mean mesoporous diameter, measured by mercury porosimetry, was 3.8 nm

Example 4

Preparation of Catalyst C4 (Invention)

Catalyst C4 was obtained by dry impregnation of the support S3 in the form of a sieved crushed compacted powder using an aqueous solution comprising tungsten and nickel salts as well as phosphoric acid $H_3PO_4$. The tungsten salt was ammonium metatungstate $(NH_4)_6H_2W_{12}O_{40}*4H_2O$ and that of nickel was nickel nitrate $Ni(NO_3)_2*6H_2O$. Following maturation at ambient temperature in a water-saturated atmosphere, the sieved crushed compacted powder was dried at 120° C. overnight then calcined at 500° C. in dry air. The contents by weight of $WO_3$, NiO, $P_2O_5$ of catalyst C4 were respectively 24.7%, 3.6% and 2%.

The characteristics of catalyst C4 were as follows:

The BET surface area was 270 $m^2/g$.

The mean mesoporous diameter, measured by mercury porosimetry, was 3.7 nm

Example 5

Preparation of Catalyst C5 (Invention)

Catalyst C5 was obtained by dry impregnation of support S3 with an aqueous solution comprising platinum and palladium salts. The platinum salt was hexachloroplatinic acid $H_2PtCl_6*6H_2O$ and the palladium salt was palladium nitrate $Pd(NO_3)_2$. Following maturation at ambient temperature in a water-saturated atmosphere, the sieved crushed compacted powder was dried at 120° C. overnight then calcined at 500° C. in dry air. The final content by weight of Pt was 0.5% by weight. The final Pd content was 1.0% by weight.

The characteristics of catalyst C5 were as follows:

The BET surface area was 460 m²/g.

The mean mesoporous diameter, measured by mercury porosimetry, was 4.0 nm

Example 6

Preparation of a Catalyst C6 (Invention)

Forming Support S4

Preparation of an aluminosilicate material S4 with a hierarchical porosity constituted by zeolite nanocrystals of the Y type (FAU) (Si/Al=1.7) in an amount of 15% of the final material weight and a mesostructured aluminosilicate matrix (Si/Al=4).

14.25 g of aluminium isopropoxide was added to 78.81 g of a solution of tetramethylammonium hydroxide (TMAOH, 40% by weight). It was stirred until completely dissolved. At the same time, 24.30 g of TEOS (tetraethylorthosilicate) was dissolved in 162 ml of water. The two solutions were then mixed with vigorous stirring for 30 min. This was sealed at ambient temperature for 18 hours without stirring then autoclaved at T=90° C. for 6 days. The colloidal suspension obtained contained 30 to 120 nm nanocrystals of Y zeolite. Once synthesis was complete, the crystals were recovered by centrifuging (20000 rpm for one hour), redispersed in water (ultrasound) then centrifuged again until the solution after re-dispersion had a pH of close to 7. The pH of the colloidal suspension of nanocrystals of Y zeolite was then adjusted to 9.5 by adding a 0.1% ammoniacal solution. 1600 µl of this solution was then added to a solution containing 30 g of ethanol, 15 ml of water, 3.59 g of TEOS, 1.03 g of $AlCl_3 \cdot 6H_2O$, 0.036 ml of HCl and 1.4 g of P123 surfactant by ultrasound agitation for 24 hours. The ensemble was sent to the atomization chamber of an aerosol generator as described above and the solution was atomized in the form of fine droplets under the action of the vector gas (dry air) introduced under pressure (P=1.5 bars) using the method described in the above disclosure of the invention. The droplets were dried using the protocol described in the invention described above. The temperature of the drying oven was fixed at 350° C. The harvested powder was then calcined in air for 5 h at T=550° C. The solid was characterized by small angle and large angle XRD, by the nitrogen adsorption isotherm, by TEM and by X ray fluorescence. TEM analysis showed that the final material was constituted by nanocrystals of Y zeolite trapped in an aluminosilicate matrix with an organized mesoporosity characterized by a vermicular structure. The nitrogen adsorption isothermal analysis produced a specific surface area in the final material of $S_{BET}$=530 m²/g and a pore size in the mesopore range characteristic of the mesostructured aluminosilicate matrix with φ=4 nm. Large angle XRD analysis produced a diffractogram characteristic of Y zeolite (micropore dimension of the order of 0.74 nm). Small angle XRD showed a correlation peak associated with a vermicular organization of the mesostructured matrix. The Bragg relationship, 2d*sin (0.4)=1.5406, gave d=11 nm. The thickness of the amorphous walls of the aluminosilicate mesostructured matrix, defined by e=d−φ, was thus e=7 nm A TEM image of the elementary spherical particles obtained indicated that the particle size was characterized by a diameter of 50 to 700 nm, with a particle size distribution being centred around 300 nm. The synthesised material was used in the form of a sieved crushed compacted powder.

Support S4 was thus produced.

Preparation of Hydrocracking Catalyst C6 of the Invention

Catalyst C6 was obtained by dry impregnation of the support S4 in the form of a sieved crushed compacted powder using an aqueous solution comprising tungsten and nickel salts. The tungsten salt was ammonium metatungstate $(NH_4)_6H_2W_{12}O_{40} \cdot 4H_2O$ and that of nickel was nickel nitrate $Ni(NO_3)_2 \cdot 6H_2O$. Following maturation at ambient temperature in a water-saturated atmosphere, the sieved crushed compacted powder was dried at 120° C. overnight then calcined at 500° C. in dry air. The contents by weight of $WO_3$, NiO of catalyst C6 were respectively 24.4% and 3.4%.

The characteristics of catalyst C6 were as follows:

The BET surface area was 325 m²/g.

The mean mesoporous diameter, measured by mercury porosimetry, was 3.8 nm

Example 7

Evaluation of Catalysts C1, C2, C3, C4 and C6 in Hydrocracking a Vacuum Distillation in One High Pressure Step Catalysts C1, C2, C3, C4 and C6 the preparations of which were described in Examples 1, 2, 3, 4 and 6 were used to hydrocrack a vacuum distillate with the principal characteristics shown in Table 1.

TABLE 1

| Characteristics of vacuum distillates | |
|---|---|
| Density at 15° C. | 0.9219 |
| Sulphur (% by weight) | 2.52 |
| Nitrogen (ppm by weight) | 880 |
| Simulated distillation | |
| 5% point | 367° C. |
| 10% point | 380° C. |
| 50% point | 443° C. |
| 90% point | 520° C. |
| End point | 690° C. |

Catalysts C1, C2, C3, C4 and C6 were used in accordance with the process of the invention using a pilot unit comprising one fixed traversed bed reactor, the fluids flowing in upflow mode.

Prior to the hydrocracking test, the catalysts were sulphurized at 14 MPa at 350° C. using a straight run gas oil supplemented with 2% by weight of DMDS.

After sulphurization, the catalytic tests were carried out under the following conditions:

Total pressure: 14 MPa;

Hydrogen flow rate: 1000 liters of gaseous hydrogen per liter of injected feed; The space velocity (HSV) was 0.7 h$^{-1}$;

Temperature: temperature required to attain 70% net conversion.

The catalytic performances were expressed as the temperature required to attain 70% net conversion into products with a boiling point of less than 370° C., and by the gross selectivity for 150-370° cut middle distillate. The conversion and selectivity were expressed from the simulated distillation results.

The net conversion of products with a boiling point of less than 370° C., denoted CN 370° C., is equal to:

$$CN\ 370°\ C. = [(\%\ of\ 370°\ C.^-_{effluents}) - (\%\ of\ 370°\ C.^-_{feed})]/[100 - (\%\ of\ 370°\ C.^-_{feed})]$$

Where
% of 370° C.$^-_{effluents}$=mass of compounds with boiling points below 370° C. in effluents; and
% of 370° C.$^-_{feed}$=mass of compounds having boiling points less than 370° C. in feed.

The gross selectivity for middle distillate cut 150-370° C., denoted SB DM, is equal to:

SB DM=[(fraction of 150-370$_{effluents}$)]/[(% of 370° C.$^-_{effluents}$)].

The catalytic performances obtained are given in Table 2 below.

TABLE 2

Catalytic results for high pressure once-through hydrocracking

| Catalyst | Hsv (h$^{-1}$) | Temperature necessary to obtain 70% of CN 370° C., % by weight | SB DM, % by weight |
|---|---|---|---|
| C1 | 0.7 | 405° C. | 67.1 |
| C2 | 0.7 | 385° C. | 65.0 |
| C3 | 0.7 | 395° C. | 73.9 |
| C4 | 0.7 | 392° C. | 73.8 |
| C6 | 0.7 | 370° C. | 68.1 |

The above examples thus show the advantage of using a catalyst of the invention to carry out hydrocracking of hydrocarbon feeds. The catalysts of the invention can produce high conversions of the feed and advantageous middle distillate selectivities.

Example 8

Evaluation of Catalysts C1, C2, C3, C4 and C6 in High Pressure Once-Through Vacuum Hydrocracking Combined with a Hydrorefining Catalyst Catalysts C1, C2, C3, C4 and C6 the preparations of which were described in Examples 1, 2, 3, 4 and 6 were used to hydrocrack a vacuum distillate at high pressure (12 MPa). Catalysts C1, C2, C3, C4 and C6 were used in hydrocracking in combination with a hydrorefining catalyst, the latter being located upstream of the catalyst of the invention. The principal characteristics of the oil feed are shown in Table 3.

TABLE 3

Characteristics of vacuum distillates

| | |
|---|---|
| Density at 15° C. | 0.919 |
| Sulphur (% by weight) | 2.46 |
| Nitrogen (ppm by weight) | 930 |
| Simulated distillation | |
| 5% point | 277° C. |
| 10% point | 381° C. |
| 50% point | 482° C. |
| 90% point | 531° C. |
| End point | 545° C. |

The catalytic test unit comprised two fixed bed reactors in upflow mode. 40 ml of catalyst was introduced into each reactor. In the first reactor, that into which the feed passed first, the catalyst for the first hydrotreatment step, HR448 sold by Axens, was introduced, comprising an element from group VI and an element from group VIII deposited on alumina. In the second reactor, that into which the feed passed last, the catalyst of the invention was introduced (C1, C2, C3, C4 and C6). The two catalysts underwent an in situ sulphurization step before reaction. The catalysts were sulphurized at 12 MPa, at 350° C. using a straight run gas oil supplemented with 2% by weight of DMDS. Once sulphurization had been carried out, the feed described above could be transformed.

The catalytic tests were carried out under the following conditions:
Total pressure: 12 MPa;
Hydrogen flow rate: 1000 liters of gaseous hydrogen per liter of injected feed;
The space velocity (HSV) was 0.9 h$^{-1}$;
Temperature: temperature required to attain 70% net conversion.

The catalytic performances were expressed as the temperature required to attain 70% net conversion into products with a boiling point of less than 370° C., by the gross selectivity for middle distillate 150-370° cut. The conversion and selectivity were expressed from the simulated distillation results and the definitions are identical to those given in Example 7.

Table 4 below shows the reaction temperature necessary to obtain 70% net conversion and the gross selectivity for the catalysts of the invention.

TABLE 4

| Catalyst | Hsv (h$^{-1}$) | Temperature necessary to obtain 70% of CN 370° C., % by weight | SB DM, % by weight |
|---|---|---|---|
| C1 | 0.7 | 408° C. | 68.2 |
| C2 | 0.7 | 388° C. | 66.1 |
| C3 | 0.7 | 397° C. | 75.1 |
| C4 | 0.7 | 394° C. | 74.9 |
| C6 | 0.7 | 373° C. | 69.1 |

The above examples thus show the advantage of using a catalyst of the invention to carry out hydrocracking of hydrocarbon feeds. The catalysts of the invention can produce high conversions of the feed and advantageous middle distillate selectivities.

Example 9

Evaluation of Catalyst C5 Under Conditions Simulating the Function of the Second Reactor of a Two-Step Hydrocracking Process The feed for the second step was produced by hydrotreatment of a vacuum distillate on a hydrorefining catalyst, HR448 sold by Axens, in the presence of hydrogen, at a temperature of 395° C. and at a hourly space velocity of 0.55 h$^{-1}$. The conversion into 380° C. products was approximately 50% by weight. After a separation step, the 380° C.+ fraction was recovered and acted as the feed for the second step. The physico-chemical characteristics of this feed are shown in Table 5:

TABLE 5

Characteristics of feed for second step

| | |
|---|---|
| Density (20/4) | 0.853 |
| Sulphur (% by weight) | 2.5 |
| Nitrogen (ppm by weight) | 1.4 |
| Simulated distillation | |
| Initial point | 322° C. |
| 5% point | 364° C. |
| 10% point | 383° C. |

TABLE 5-continued

| Characteristics of feed for second step | |
|---|---|
| 50% point | 448° C. |
| 90% point | 525° C. |
| End point | 589° C. |

This feed was injected into the $2^{nd}$ step of the hydrocracking test unit which comprised a fixed bed reactor in upflow mode into which the catalyst C5 prepared in Example 5 was introduced. Before injecting the feed, the catalyst was reduced in pure hydrogen at 450° C. for 2 hours.

The operating conditions for the test unit were as follows:
Total pressure: 14 MPa;
Hydrogen flow rate: 1000 liters of gaseous hydrogen per liter of injected feed;
The space velocity (HSV) was 1.1 $h^{-1}$;
Temperature: 390° C.

The catalytic performances were expressed as the net conversion into products with a boiling point of less than 370° C., by the gross selectivity for middle distillate 150-370° cut and the gas oil yield/kerosene yield ratio in the middle distillate fraction. They are expressed from the simulated distillation results and the definitions are identical to those given in Example 7.

The catalytic performances obtained under these conditions are described in Table 6 of this example.

TABLE 6

| Catalytic results | | | |
|---|---|---|---|
| Catalyst | Hsv ($h^{-1}$) | CN 370° C., % by weight | SB DM, % by weight |
| C5 | 1.1 | 78.0 | 72.0 |

Thus, this example shows the advantage of using a catalyst of the invention to carry out hydrocracking of hydrocarbon feeds. The catalyst of the invention can produce high conversions of the feed and advantageous selectivities for middle distillates.

Example 10

Evaluation of Catalysts C1, C2, C3, C4 and C6 in Moderate Pressure Once-Through Vacuum Hydrocracking (Mild Hydrocracking)

Catalysts C1, C2, C3, C4 and C6 the preparations of which were described in Examples 1, 2, 3, 4 and 6 were used to hydrocrack a vacuum distillate the principal characteristics of which are shown in Table 7.

TABLE 7

| Characteristics of vacuum distillates | |
|---|---|
| Density at 15° C. | 0.919 |
| Sulphur (% by weight) | 2.46 |
| Nitrogen (ppm by weight) | 930 |
| Simulated distillation | |
| 5% point | 277° C. |
| 10% point | 381° C. |
| 50% point | 482° C. |
| 90% point | 531° C. |
| End point | 545° C. |

Catalysts C1, C2, C3, C4 and C6 were used in accordance with the process of the invention by employing a pilot unit comprising one traversed fixed bed reactor, the fluids moving in upflow mode.

Prior to the hydrocracking test, the catalysts were sulphurized at 5.5 MPa, at 350° C. using a straight run gas oil supplemented with 2% by weight of DMDS.

After sulphurization, the catalytic tests were carried out under the following conditions:
Total pressure: 5.5 MPa;
Hydrogen flow rate: 450 liters of gaseous hydrogen per liter of injected feed;
The space velocity (HSV) was 0.8 $h^{-1}$;
Temperature: 405° C.

The catalytic performances were expressed as the net conversion into products with a boiling point of less than 370° C., by the net selectivity for 150-370° cut middle distillate and by the gas oil yield/kerosene yield ratio in the middle distillate fraction. They are expressed from the simulated distillation results and the definitions are identical to those given in Example 7.

The catalytic performances obtained are given in Table 8 below.

TABLE 8

| Catalytic results for moderate pressure mild hydrocracking | | |
|---|---|---|
| Catalyst | CN 370° C., % by weight | SB DM, % by weight |
| C1 | 42.1 | 77.0 |
| C2 | 47.1 | 76.1 |
| C3 | 49.5 | 80.9 |
| C4 | 50.2 | 81.0 |
| C6 | 53.1 | 79.0 |

The above example thus shows the advantage of using a catalyst of the invention to carry out hydrocracking of hydrocarbon feeds. The catalysts of the invention can produce high conversions of the feed and advantageous middle distillate selectivities.

The invention claimed is:

1. A catalyst comprising:
at least one support formed from at least one material with a hierarchical porosity comprising silicon and containing at least two elementary spherical particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 30 nm, said elementary spherical particles having a maximum diameter of 100 μm;
at least one active phase containing at least one hydrodehydrogenating element from group VIB and/or group VIII of the periodic table of the elements.

2. A catalyst according to claim 1, in which said hydrodehydrogenating element of said active phase is an element from group VIB.

3. A catalyst according to claim 2, in which said hydrodehydrogenating element of said active phase is molybdenum.

4. A catalyst according to claim 2, in which said hydrodehydrogenating element of said active phase is tungsten.

5. A catalyst according to claim 1, in which said hydrodehydrogenating element of said active phase is an element group VIII.

6. A catalyst according to claim 5, in which said hydrodehydrogenating element is cobalt, nickel or platinum.

7. A catalyst according to claim 1, in which said active phase is formed by at least one element from group VIB and at least one element from group VIII.

8. A catalyst according to claim 7, in which said element from group VIII is nickel and said element from group VIB is tungsten.

9. A catalyst according to claim 1, in which said zeolitic nanocrystals have a pore size of 0.2 to 0.8 nm.

10. A catalyst according to claim 1, in which said zeolitic nanocrystals comprising at least one zeolite selected from the group consisting of aluminosilicates ZSM-5, ZSM-48, ZSM-22, ZSM-23, ZBM-30, EU-1, EU-2, EU-11, beta, zeolite A, Y, USY, VUSY, SDUSY, mordenite, NU-87, NU-88, NU-86, NU-85, IM-5, IM-12, and ferrierite and/or at least one related solid selected from the group consisting of silicoaluminophosphates SAPO-11 and SAPO-34.

11. A catalyst according to claim 10, in which said zeolitic nanocrystals comprise at least one zeolite that is an aluminosilicate with structure type MFI, BEA, FAU, or LTA and/or at least one related solid that is a silicoaluminophosphate with structure type AEL, or CHA.

12. A catalyst according to claim 1, in which the elementary spherical particles have a diameter of 50 nm to 10 μm.

13. A catalyst according to claim 1, in which the matrix based on a mesostructured oxide of silicon of said material with a hierarchical porosity is entirely silicic.

14. A catalyst according to claim 1, in which the matrix based on a mesostructured oxide of silicon of the material with a hierarchical porosity comprises at least one element X selected from the group consisting of aluminium, titanium, tungsten, zirconium, gallium, germanium, phosphorus, tin, antimony, lead, vanadium, iron, manganese, hafnium, niobium, tantalum and yttrium.

15. A catalyst according to claim 14, in which the element X is aluminium.

16. A catalytic process for hydrocracking and/or hydroconversion of hydrocarbon feed, comprising performing said hydrocracking and/or hydroconversion by a catalyst of claim 1.

17. A hydrocracking and/or hydroconversion process according to claim 16, carried out in accordance with a once-through process.

18. A hydrocracking and/or hydroconversion process according to claim 17, comprising at least one first hydrorefining reaction zone and at least one second reaction zone in which hydrocracking of at least a portion of the effluent from the first zone is carried out and comprising incomplete separation of ammonia from the effluent leaving the first zone.

19. A hydrocracking and/or hydroconversion process according to claim 17, comprising:
a first hydrorefining reaction zone in which the feed is brought into contact with at least one hydrorefining catalyst having a degree of cyclohexane conversion of less than 10% by weight in the standard activity test; and
a second hydrocracking reaction zone in which at least a portion of the effluent from the hydrorefining step is brought into contact with at least one hydrocracking catalyst having a degree of cyclohexane conversion of more than 10% by weight in the standard activity test.

20. A hydrocracking and/or hydroconversion process according to claim 16, carried out as a two-step process.

21. A process according to claim 16, operated in fixed bed mode.

22. A process according to claim 16, operated in ebullated bed mode.

23. A catalytic process for the hydrotreatment of a hydrocarbon feed, comprising performing said hydrotreatment by a catalyst according to claim 1.

24. A process according to claim 23, placed upstream of a hydrocracking and/or hydroconversion process.

25. A process according to claim 16, operated in the presence of hydrogen, at a temperature of more than 200° C., at a pressure of more than 1 MPa, at an hourly space velocity of 0.1 to 20 h$^{-1}$ and the quantity of hydrogen introduced being such that the volume ratio of liters of hydrogen/liters of hydrocarbon is 80 to 5000 l/l.

26. A process according to claim 16, in which the hydrocarbon feed is from the following categories of feeds: light cycle oil, light gas oils from a catalytic cracking unit, atmospheric distillates, vacuum distillates, feeds from units for aromatic extraction of lubricating base oils or from solvent dewaxing of lubricating base oils, distillates deriving from processes for fixed bed or ebullated bed desulphurization or hydroconversion of atmospheric residues and/or vacuum residues and/or deasphalted oils, or deasphalted oils, taken alone or a mixture.

27. A process according to claim 16, in which said hydrocarbon feed passes initially over a bed of catalyst or adsorbant which is different from the hydrocracking and/or hydroconversion or hydrotreatment catalyst.

28. A catalyst consisting essentially of:
at least one support formed from at least one material with a hierarchical porosity comprising silicon and containing at least two elementary spherical particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 30 nm, said elementary spherical particles having a maximum diameter of 100 μm;
at least one active phase containing at least one hydrodehydrogenating element from group VIB and/or group VIII of the periodic table of the elements.

29. A catalyst comprising:
at least one support formed from at least one material with a hierarchical porosity comprising silicon and containing at least two elementary spherical particles, each of said spherical particles comprising zeolitic nanocrystals having a pore size in the range 0.2 to 2 nm and a matrix based on silicon oxide, which is mesostructured, having a pore size in the range 1.5 to 30 nm and having amorphous walls with a thickness in the range 1 to 30 nm, said elementary spherical particles having a maximum diameter of 100 μm, and wherein the zeolitic nanocrystals represent 0.1% to 40% by weight of the material with a hierarchical porosity;
at least one active phase containing at least one hydrodehydrogenating element from group VIB and/or group VIII of the periodic table of the elements.

* * * * *